United States Patent [19]
Witt

[11] Patent Number: 5,623,627
[45] Date of Patent: Apr. 22, 1997

[54] COMPUTER MEMORY ARCHITECTURE INCLUDING A REPLACEMENT CACHE

[75] Inventor: David B. Witt, Austin, Tex.

[73] Assignee: Advanced Micro Devices, Inc., Sunnyvale, Calif.

[21] Appl. No.: 164,246

[22] Filed: Dec. 9, 1993

[51] Int. Cl.$^6$ .................................................. G06F 12/08
[52] U.S. Cl. ........................... 395/449; 395/455; 395/750
[58] Field of Search .................................. 395/400, 425, 395/403, 440, 445, 449, 450, 452, 453, 455, 460, 461, 750; 364/200 MS File, 900 MS File; 365/49

[56] References Cited

U.S. PATENT DOCUMENTS

| | | | |
|---|---|---|---|
| 4,458,310 | 7/1984 | Chang | 395/463 |
| 5,029,126 | 7/1991 | Yamaguchi | 365/49 |
| 5,107,465 | 4/1992 | Fung et al. | 365/230.08 |
| 5,185,878 | 2/1993 | Barror et al. | 395/425 |
| 5,257,361 | 10/1993 | Doi et al. | 395/417 |
| 5,261,066 | 11/1993 | Jonppi et al. | 395/425 |
| 5,307,477 | 4/1994 | Taylor et al. | 395/449 |
| 5,317,718 | 5/1994 | Jonppi | 395/425 |
| 5,369,753 | 11/1994 | Tipley | 395/425 |

FOREIGN PATENT DOCUMENTS

| | | |
|---|---|---|
| 2154106 | 5/1972 | Germany . |
| 2215887 U | 9/1989 | United Kingdom . |

OTHER PUBLICATIONS

Mroz et al., "Advanced Clock Controller Cuts Power Need, Size of Static CMOS Systems", Oct. 4, 1984, pp. 185–191.
Brian Case, "AMD Unveils First Superscalar 29K Core", Microprocessor Report, Oct. 24, 1994, pp. 23–26.
"HP's PA7100LC: A Low-Cost Superscalar PA–RISC Processor"; Feb. 22, 1993; Patrick Knebel, et al.; IEEE Computer Society Press, Los Alamitos, CA, Digest of Papers, Feb. 22–26, 1993, pp. 441–447.
"Vertical Partitioning in Cache Hierarchies"; IBM Technical Disclosure Bulletin (Anonymous), vol. 30, No. 8, Jan., 1988, p. 33.
Michael Slater, "AMD's K5 Designed to Outrun Pentium", Microprocessor Report, Oct. 24, 1994, pp. 1, 6–11.
Norman P. Jouppi, "Improving Direct–Mapped Cache Performance By The Addition Of A Small Fully–Associative Cache And Prefetch Buffers", IEEE Seventh Annual Symposium On Computer Architecture, 1990.

*Primary Examiner*—Eddie P. Chan
*Assistant Examiner*—Hiep T. Nguyen
*Attorney, Agent, or Firm*—Skjerven, Morrill, MacPherson, Franklin & Friel, L.L.P.

[57] ABSTRACT

A microprocessor is provided with an integral, two level cache memory architecture. The microprocessor includes a microprocessor core and a set associative first level cache both located on a common semiconductor die. A replacement cache, which is at least as large as approximately one half the size of the first level cache, is situated on the same semiconductor die and is coupled to the first level cache. In the event of a first level cache miss, a first level entry is discarded and stored in the replacement cache. When such a first level cache miss occurs, the replacement cache is checked to see if the desired entry is stored therein. If a replacement cache hit occurs, then the hit entry is forwarded to the first level cache and stored therein. If a cache miss occurs in both the first level cache and the replacement cache, then a main memory access is commenced to retrieve the desired entry. In that event, the desired entry retrieved from main memory is forwarded to the first level cache and stored therein. When a replacement cache entry is removed from the replacement cache by the replacement algorithm associated therewith, that entry is written back to main memory if that entry was modified. Otherwise the entry is discarded.

21 Claims, 12 Drawing Sheets

PHYSICAL ADDRESS FROM 1ST LEVEL CACHE MISS

VALUE STORED IN EACH BLOCK

COMPUTER MEMORY ARCHITECTURE INCLUDING A REPLACEMENT CACHE

BACKGROUND OF THE INVENTION

This invention relates in general to memory architectures for computer systems and, more particularly, to high performance cache memories for use with computer processors.

Processors often take several clock cycles to access data which is stored in a main memory located external to the processor. Not only do these external memory accesses require a significant amount of time, these accesses also consume a significant amount of power. Cache memories have often been used to enhance computer system performance by providing a processor with a relatively small, high speed memory (or cache) for storing instructions and data which have recently been accessed by the processor. These instructions and data are stored in the cache in the hope that, since they have been accessed once, they will be accessed again relatively soon. The speed or access time of the cache memory is substantially faster than that of the external main memory. By retrieving an instruction or data from the cache when a cache hit occurs rather than accessing the slower external main memory, significant time can be saved in the retrieval of the desired information.

A recent trend has been to integrate a first level (L1) cache on the microprocessor chip together with the microprocessor core as shown in FIG. 1. In this particular example, the microprocessor chip has been provided with a level 1 cache (L1) located on the chip and a level 2 cache (L2) located external to the microprocessor chip. The on-chip L1 cache includes both an L1 instruction cache and an L1 data cache. The L1 caches and the L2 cache are coupled via physical address and physical data buses to the external main memory in this example. The off-chip L2 cache is typically orders of magnitude larger than the on-chip L1 caches. For example, 4 Kbyte on-chip L1 caches and 256 Kbyte–512 Kbyte off-chip L2 external caches are common.

In a typical cache arrangement, the second level L2 cache includes all first level cache entries as subsets. In other words, all of the entries of the first level L1 caches are also stored in the second level L2 cache. In this manner, accesses to the L2 cache do not have to inspect the L1 caches unless there is an indication that the requested instruction or data is also stored in the L1 caches.

Both "direct mapped" and "associative" caches are known to increase memory performance. In direct mapped caches, a particular block or line of information can only be stored in a single location in the cache according to the block-frame address of the block or line. In a "fully associative" cache, the block can be placed anywhere within the cache, whereas in a "set-associative" cache the block is restricted to be stored in certain sets of storage locations. In a 2-way set associative cache, each set in the cache can store 2 blocks of information. In a 4-way set associative cache, each set in the cache can store 4 blocks of information. Cache performance generally increases with increased associativity. However, increased associativity tends to require caching circuits of increased complexity.

A "miss cache" is described by Norman P. Jouppi in his publication entitled "Improving Direct-Mapped Cache Performance By The Addition Of A Small Fully-Associative Cache And Prefetch Buffers", IEEE Seventh Annual Symposium On Computer Architecture, 1990. The described miss cache is a small, fully associative cache which is located between a first level direct-mapped cache and its refill path. If a miss occurs in the direct-mapped cache but a hit occurs in the miss cache, then significant time is saved by avoiding an access to main memory. Such miss caches are typically very small and hold 2–5 entries or blocks in one example.

Jouppi also describes an improvement to miss-caching, namely the "victim cache". A victim cache is a small, fully associative cache as described with reference to the miss cache, except that the small fully associative cache (victim cache) is loaded with the victim of the miss instead of the requested block. In other words, when a cache miss occurs in the direct mapped L1 cache, the block or "victim" that is discarded from the L1 cache is stored in the victim cache. The victim caches described by Jouppi typically hold 1–5 entries. The goal of Jouppi's victim cache is to increase the performance of a direct mapped first level cache to a level approximating the performance of a set associative cache by the addition of a small (1–5 entry) fully associative victim cache. The victim cache contains only entries that have recently been kicked out of the direct mapped first level cache. From the above it is seen that the goal of the Jouppi victim cache is to increase the performance of a direct mapped cache.

With the ever increasing demand on memory for faster access which is caused by processors with higher clock speeds and larger appetites for instructions and data, even faster cache memory systems than those presently available are clearly desirable.

SUMMARY OF THE INVENTION

Accordingly, one advantage of the cache memory system of the present invention is improved performance of a first level, set associative memory cache.

Another advantage of the disclosed cache memory system is increased cache performance while avoiding undue increases in the amount of chip area consumed by the cache.

Yet another advantage of the disclosed cache memory system is an increase in the performance of split instruction/data first level caches without an increase in size of such first level caches.

Still another advantage of the cache memory system of the present invention is the conservation of power.

In accordance with one embodiment of the present invention, a microprocessor is provided including a semiconductor die and a microprocessor core situated on the semiconductor die. The microprocessor also includes a first level set associative cache situated on the semiconductor die and coupled to the microprocessor core. The first level cache exhibits a predetermined byte size sufficiently large to store a predetermined number of information entries. In one embodiment, the first level cache is a split instruction cache-data cache. The microprocessor further includes a replacement cache situated on the semiconductor die and coupled to the first level cache. The replacement cache stores information entries which are discarded from the first level cache as a result of cache misses in the first level cache. The replacement cache is at least as large as approximately one half the size of the first level cache. For highest performance at a given clock rate, both the first level cache and the replacement cache are set associative caches.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

I. Microprocessor Addressing

Figure 1:
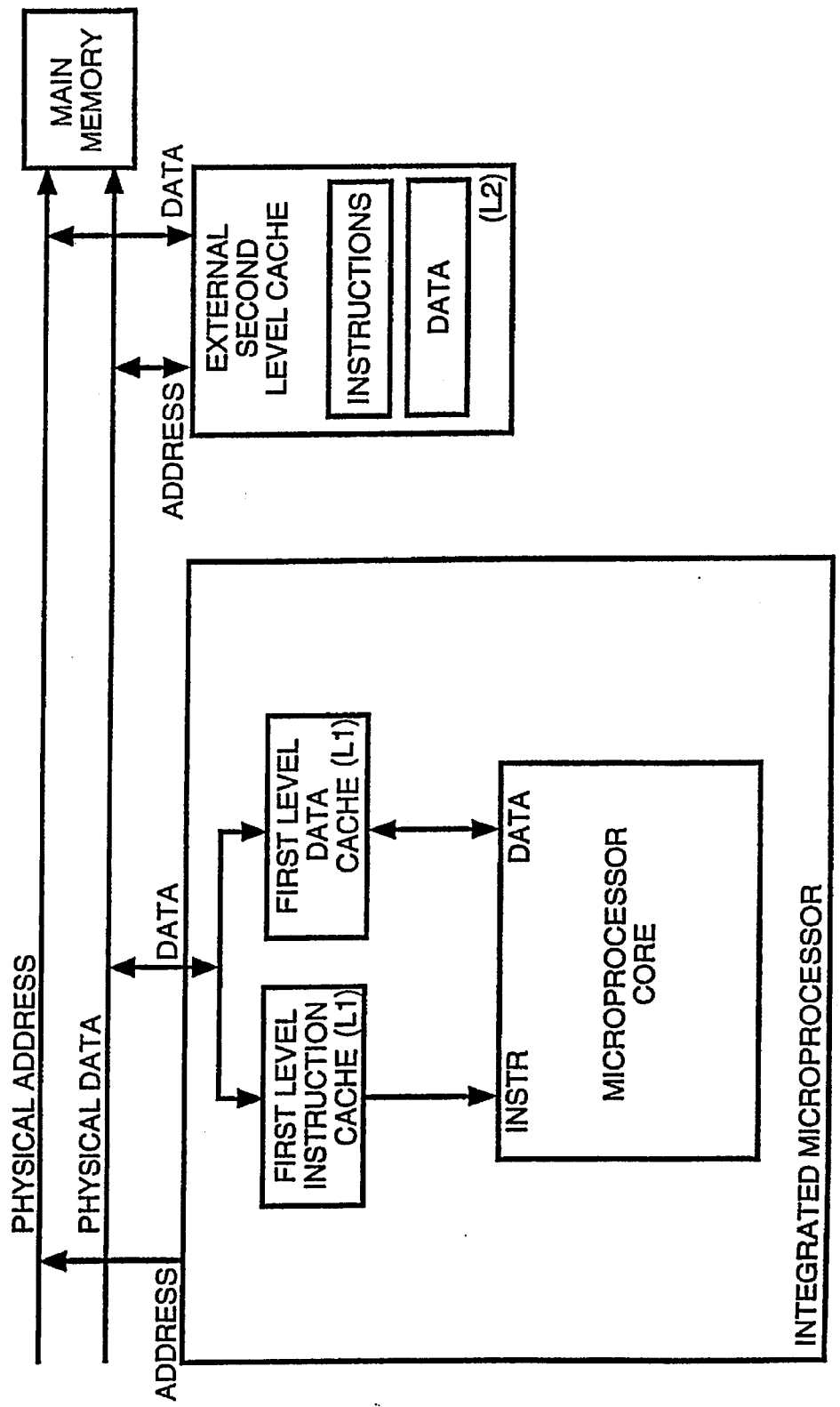
FIG. 1 is a block diagram of a conventional cache memory architecture including first and second level cache memories.

Before discussing the invention in detail, it is helpful to have an understanding of the addressing scheme employed by a conventional microprocessor architecture such as the Intel X86 architecture. The X86 architecture is a microprocessor architecture which has gained widespread acceptance. This architecture, first introduced in the i386™ microprocessor, is also the basic architecture of both the i486™ microprocessor and the Pentium™ microprocessor, all available from the Intel corporation of Santa Clara, Calif. The X86 architecture provides for three distinct types of addresses, namely a logical (i.e., virtual) address, a linear address and a physical address.

The logical address represents an offset from a segment base address. The segment base address is accessed via a selector. More specifically, the selector, which is stored in a segment register, is an index which points to a location in a global descriptor table (GDT). The GDT location stores the linear address corresponding to the segment base address. More discussion of linear addressing is found in the copending patent application entitled "Linearly Addressable Microprocessor Cache" by David B. Witt"(Ser. No. 146,381, filed Nov. 3, 1993, Atty Docket No. M-2412US), the disclosure of which is incorporated herein by reference.

The translation between logical and linear addresses depends on whether the microprocessor is in Real Mode or Protected Mode. When the microprocessor is in Real Mode, then a segmentation unit shifts the selector left four bits and adds the result to the offset to form the linear address. When the microprocessor is in Protected Mode, then the segmentation unit adds the linear base address pointed to by the selector to the offset to provide the linear address.

The physical address is the address which appears on the address pins of the microprocessor and is used to physically address external memory. The physical address does not necessarily correspond to the linear address. If paging is not enabled then the 32-bit linear address corresponds to the physical address. If paging is enabled, then the linear address must be translated into the physical address. A paging unit, which is usually included as part of the microprocessor's memory management unit, performs this translation.

The paging unit uses two levels of tables to translate the linear address into a physical address. The first level table is a Page Directory and the second level table is a Page Table. The Page Directory includes a plurality of page directory entries; each entry includes the address of a Page Table and information about the Page Table. The upper 10 bits of the linear address (A22–A31) are used as an index to select a Page Directory Entry. The Page Table includes a plurality of Page Table entries; each Page Table entry includes a starting address of a page frame and statistical information about the page. Address bits A12–A21 of the linear address are used as an index to select one of the Page Table entries. The starting address of the page frame is concatenated with the lower 12 bits of the linear address to form the physical address.

Because accessing two levels of table for every memory operation substantially affects performance of the microprocessor, the memory management unit generally also includes a cache of the most recently accessed page table entries. This cache is called a translation lookaside buffer (TLB). The microprocessor only uses the paging unit when an entry is not in the TLB.

The first processor which conformed to the X86 architecture and which also included a cache was the 486 processor. The 486 processor employed an 8 Kbyte unified cache. In contrast, the Pentium™ processor includes separate 8 Kbyte instruction and data caches. The 486 processor cache and the Pentium™ processor caches are accessed via physical addresses; however, the functional units of these processors operate with logical addresses. Accordingly, when the functional units require access to these caches, the logical address must be converted to a linear address and then to a physical address.

In microprocessor architectures other than the X86 architecture, it is known to use virtually addressed caches (ie logical address) to eliminate the address translation time from a cache hit. However, because input/output devices (I/O) use physical addresses, mapping is required for the I/O to interact with the cache. In these systems, there are generally only two levels of addressing, virtual and physical, and thus only a single translation is required for the physically addressed I/O devices to interact with the virtually addressed cache. Additionally, with a virtually addressed cache, every time a process is switched, the virtual addresses refer to different physical addresses, and thus, the cache must be flushed as the virtually addressed cache entries are potentially invalid. Additionally, with a virtually addressed cache, it is possible for two different virtual addresses to correspond to the same physical address. These duplicate addresses are called aliases and could result in two locations in a virtual cache having information from the same physical address, the information in only one of the locations being modified.

II. Microprocessor Cache Architecture Overview

The following sets forth a description of the best mode contemplated for carrying out the invention. The description is intended to be illustrative of the invention and should not be taken to be limiting.

Figure 2:
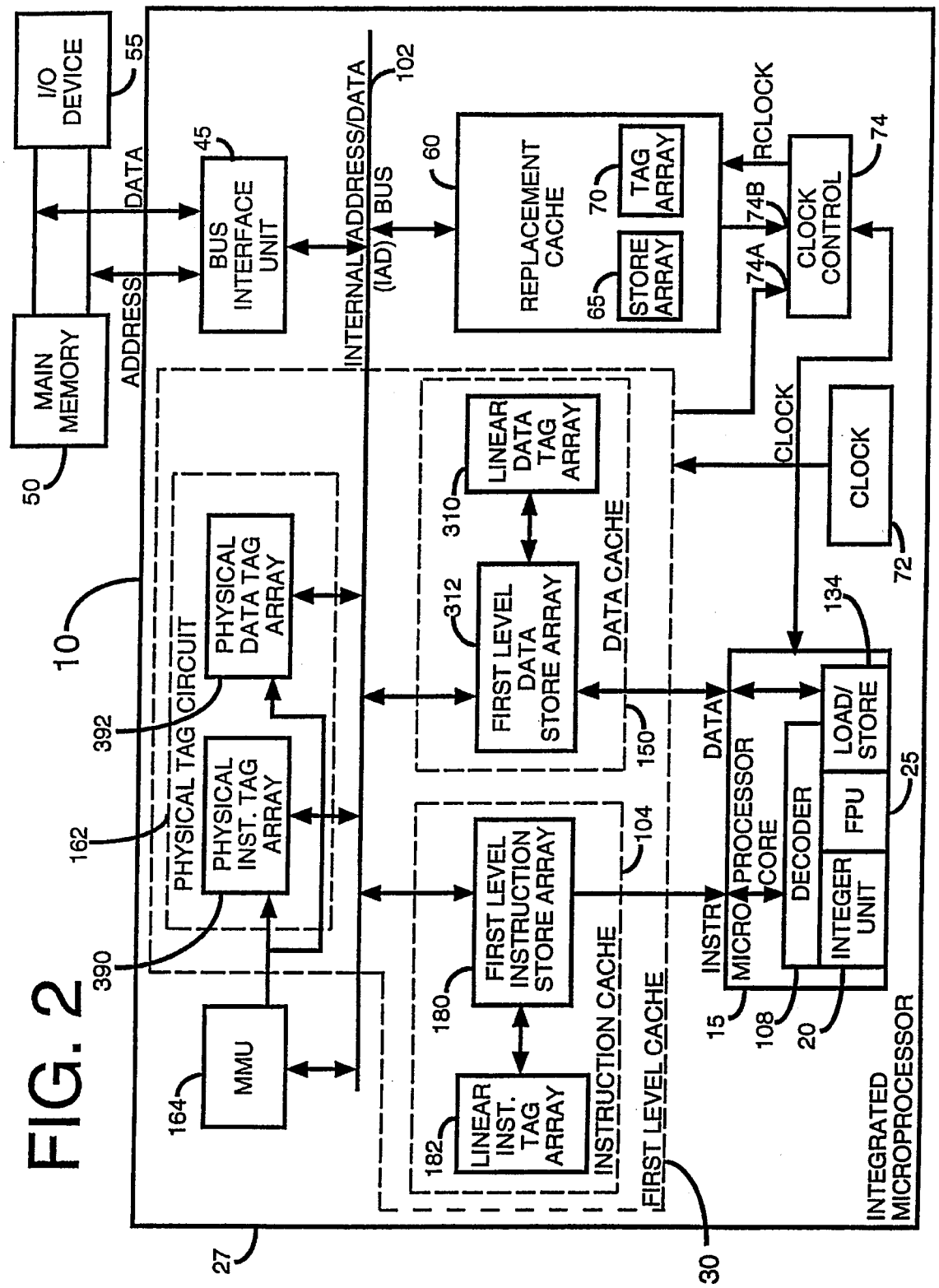
FIG. 2 is a block diagram of a replacement cache memory architecture in accordance with the present invention.

FIG. 2 is a block diagram which depicts an integrated microprocessor 10 that uses the cache memory architecture of the present invention. Microprocessor 10 contains a microprocessor core 15 which includes an integer unit 20 for handling integer operations and a floating point unit 25 for handling floating point operations. Microprocessor core 15 further includes an instruction decoder 108 which decodes instructions and a load/store unit 134 which supervises loading and storing operations. Microprocessor core 15 is alternatively referred to as the central processing unit (CPU) of microprocessor 10. Microprocessor core 15 includes a DATA port to which data are provided for processing and an INSTRUCTION port to which instructions are provided for execution.

In the preferred embodiment of the invention, microprocessor core 15 is a superscalar processor. However, the invention is applicable to other types of processors as well, for example scalar and vector processors. While in FIG. 1 only integer unit 20, FPU 25, decoder 108 and load/store unit 134 are shown within microprocessor core 15, it should be understood that other functional units such as a branching unit which predicts branches in the program being executed and other functional units may also be included in core 15.

Microprocessor 10 is an integrated processor in the sense that other computer components besides microprocessor core 15 are included together on the same semiconductor die 27 as microprocessor core 15. For example a first level cache 30, indicated within dashed lines, is incorporated in microprocessor 10 on die 27. First level cache 30 includes a first level instruction store array 180 and a first level data store array 312 which are situated on die 27 and respectively coupled to the INSTRUCTION port and DATA port of microprocessor core 15.

It is noted that first level cache 30 is a split instruction-data, set associative cache in this embodiment. The first level instruction store array 180 and first level data store array 312 are also coupled via an internal address/data bus (IAD) 102 to a bus interface unit 45. IAD bus 102 and bus interface unit 45 are both situated on die 27. Bus interface unit 45 is of the conventional type and includes a physical address port and a data port which are coupled to corresponding ports on a main memory 50. Main memory 50 is located externally to microprocessor 10 and is alternatively referred to as external memory. One or more input/output (I/O) devices 55 may also be coupled to bus interface unit 45 as shown in FIG. 2.

First level cache 30 further includes a linear instruction tag array 182 and a linear data tag array 310. Linear instruction tag array 182 is an array which stores the linear addresses or tags which indicate those instructions which are presently stored in first level instruction store array 180. Linear data tag array 310 is an array which stores the linear addresses or tags which indicate the data which are presently stored in first level data store array 312.

First level cache 30 also includes a physical instruction tag array 390 and a physical data tag array 392 which are coupled to instruction store array 180 and data store array 312 via internal address/data bus 102. Physical instruction tag array 390 is an array that stores the actual physical addresses or tags which indicate those instructions that are presently stored in first level instruction store array 180. Physical data tag array 392 is an array that stores the physical addresses or tags which indicate the data that are presently stored in first level data store array 312.

First level instruction store array 180 and linear instruction tag array 182 together form an instruction cache 104 (indicated by dashed lines) within first level cache 30. First level data store array 312 and linear data tag array 310 together form a data cache 150 within first level cache 30.

A replacement cache 60 is coupled to internal address/data bus (IAD) bus 102 as shown in FIG. 2. Replacement cache 60 is a unified cache in which both instructions and data are stored. Replacement cache 60 includes a store array 65 and a tag array 70. Instructions and data are stored in store array 65 and the physical addresses of such instructions and data in main memory are stored as address tags in tag array 70. In this manner by scanning the tags in tag array 70, it can be determined whether replacement cache 60 contains a particular instruction or piece of data.

In one embodiment of the invention wherein first level instruction store array 180 is 16 Kbytes in size and first level data store array 312 is 8 Kbytes in size, a replacement cache 60 with a 32 Kbyte store array 65 is employed. In the preferred embodiment of the invention, the instruction cache and data cache of first level cache 30 and replacement cache are four-way set associative. Other embodiments of the invention are contemplated however wherein the replacement cache employs other levels of set associativity or is direct mapped. Replacement cache 60 advantageously increases the performance of the split first level caches, namely instruction cache 104 and data cache 150, without necessitating an increase in the size of those caches.

Unlike many other cache structures, the entries of replacement cache 60 are not subsets of first level cache 30. Rather, the entries of replacement cache 60 are discarded entries from first level cache 30 which are kicked out of first level cache 30 according the particular replacement algorithm used by first level cache 30. Replacement algorithms which may be used for the first level cache replacement algorithm include conventional least recently used (LRU), least frequently used (LFU) and "random" replacement algorithms. The terms "entry", "block" and "line" and regarded as being synonymous and having their conventional meaning with respect to cache technology.

For purposes of this discussion, it is assumed that microprocessor 10 has been operating for a time sufficient for the first level caches, namely instruction store array 180 and data store array 312 to be filled with instructions and data, respectively. When a first level cache hit occurs, the requested instruction or data is contained in instruction store array 180 or data store array 312. If the requested information is an instruction, then the tags in linear instruction tag array 182, or alternatively, physical instruction tag array 390, are scanned in parallel within each array. If the requested information is data, then the tags in linear data tag array 310, or alternatively, physical data tag array 310, are scanned in parallel within each array.

More information as to such scanning of linear instruction tag array 182 and physical instruction tag array 390 is found in the copending patent application entitled "Linearly Addressable Microprocessor Cache" by David B. Witt" (Ser.

No. 146,381, filed Nov. 3, 1993, Atty Docket No. M-2412US), the disclosure of which is incorporated herein by reference. Briefly however, it is noted that the linear tags are scanned first for a hit or miss. If a miss occurs, then the physical tags are scanned for a hit or miss. It is noted that since the split first level instruction and data caches are linearly addressed, it is possible to have aliased copies. Aliased copies are information elements (instruction or data elements) which have different linear addresses but the same physical address. The linear addressing scheme allows only one copy of the physical data to be present to avoid having multiple updates of the same physical address pending. Thus, checking both the instruction and data physical tags assures that no aliased copy can exist for the desired physical address. If an aliased entry is found to exist for the desired physical address, then the linear tag stored in the linear (instruction or data) tag array is overwritten with the new linear tag corresponding to the matched physical tag in the physical (instruction or data) tag array. In other words, the linear tag is overwritten with the new linear tag at the entry where the alias occurs. Since one information element is always cached in the case of aliasing, an access is not made to replacement cache 60 in the case of an alias hit. If misses occur in the physical tag arrays, then the cache memory system checks the replacement tag array 70 which always contains entries that are not in the first level arrays. There are no aliasing concerns with respect to replacement cache 60 since replacement cache 60 employs physical tags and physical addressing.

Returning now to a discussion of cache hits and misses in first level cache 30, it is noted that if a match occurs between the address of the requested instruction or data information and a tag in one of the first level cache tag arrays, then a first level cache miss has occurred. In this event, the addressed instruction or data is retrieved from the appropriate corresponding instruction store array or data store array and provided to microprocessor 15 for processing.

However, if no match occurs between the address of the requested instruction or data information and a tag in the first level instruction and data cache tag arrays, then a first level cache miss has occurred. When a first level cache miss occurs, the requested instruction or data is in neither first level instruction store array 180 nor first level data store array 312. In this event, the replacement tags in replacement tag array 70 of replacement cache 60 are scanned to see if the requested instruction or data is contained in replacement cache 60.

If a match is found between the physical address of the requested instruction or data and a replacement tag in replacement tag array 70, then a replacement cache hit has occurred and the requested information is contained within store array 65 of replacement cache 60. In this situation, the block within replacement cache 60 which contains the addressed instruction or data is retrieved from replacement store array 65. This retrieved information is provided to the first level cache for storage therein and ultimately to microprocessor 15 for processing. The retrieved information (ie. the entry or block containing the retrieved information) is transmitted to first level cache 30 for storage in the appropriate storage array thereof. More particularly, if the retrieved information is an entry containing an instruction, then the retrieved information is stored in first level instruction store array 180. If the retrieved information is an entry containing data, then the retrieved information is stored in first level data store array 312.

In the case of a replacement cache hit, the hit entry (the entry for which a hit occurs) from replacement cache 60 is stored at a location in the first level cache according to its address as per the set-associative nature of the first level cache. Moreover, the hit entry is stored at a location within the first level cache which is considered to be available as per the particular replacement cache algorithm selected for first level cache 30. For example, a least recently used (LRU), least frequently used (LFU) or random replacement algorithm may be employed as the replacement algorithm of set associative first level cache 30.

When the retrieved information is transmitted to first level cache 30 for storage, an entry or block of information from cache 30 is discarded from cache 30. This information is denoted as discard information or as the discard information entry and is determined by the particular type of replacement algorithm selected for first level cache 30. The discard information entry is transmitted from first level cache 30 to replacement cache 60 for storage as an entry thereof.

If there is a replacement cache miss, then main memory 50 is accessed and the requested information is retrieved therefrom. The entry retrieved from main memory 50 is transmitted to first level cache 30 and stored therein. The entry is then provided to microprocessor core 15 for processing by core 15. In response, a discard entry is ejected from first level cache 30. The discard entry is transmitted to replacement cache 60 and is stored in replacement store array 65.

To conserve power in microprocessor 10, replacement cache 60 is not clocked until it is time to access replacement cache 60. In other words, replacement cache 60 is not clocked until it is time to scan tag array 70 of replacement cache 60 for hits. Replacement cache 60 remains in an idle, power-conserving state until that time. A clock circuit 72 provides a reference clock or time base signal (CLOCK) to microprocessor core 15 and first level cache 30 as shown. This CLOCK signal is also supplied to clock control circuit 74 which supplies an RCLOCK signal to replacement cache 60 to provide clocking for cache 60. At input 74A, clock control circuit 74 receives first level miss information from first level cache 30 to indicate when a miss has occurred in first level cache 30. Clock control circuit 74 generates an idle RCLOCK clock signal (a clock signal with no clock pulses) until it receives first level miss information. When clock control circuit 74 receives first level miss information, clock control circuit 74 generates an RCLOCK signal with active clock pulses which cause replacement cache 60 to be clocked. In response, replacement cache 60 becomes active and draws power. When the access to replacement cache 60 is complete as indicated to clock control input 74B by a complete signal from replacement cache 60, then the pulses of the RCLOCK signal cease. In this manner, clocking of replacement cache 60 ceases and power conservation again commences and continues until the next replacement cache access.

Figure 3A:
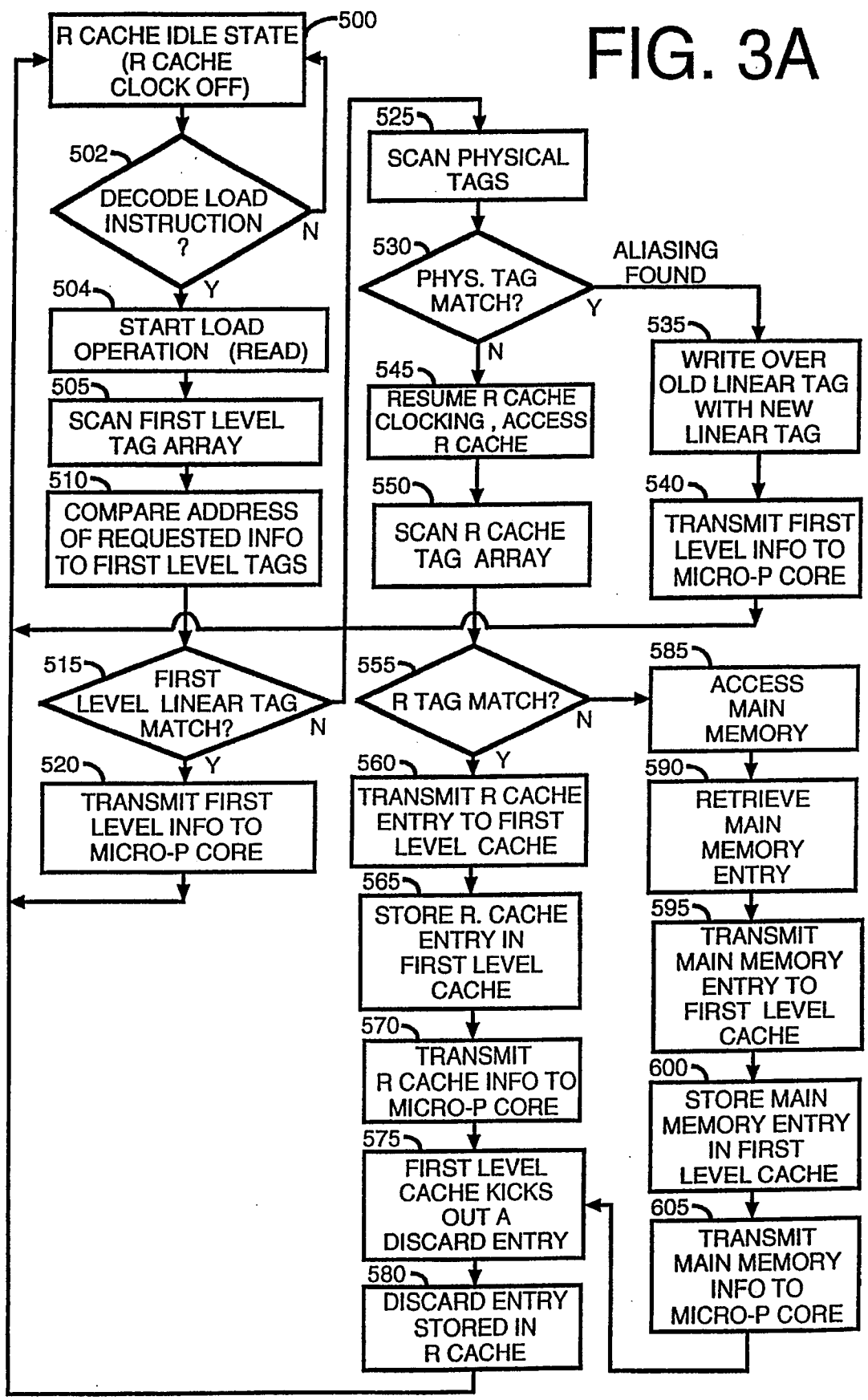
FIG. 3A is a flowchart showing the operation of the replacement cache architecture during a memory read operation.

A flowchart showing the operation of the replacement cache architecture during a memory read or load operation is shown in FIG. 3A. Prior to actually commencing a load operation, replacement cache 60 is placed in an idle state wherein replacement cache 60 is not clocked as per block 500. This action conserves power. Replacement cache 60 stays in this idle, power conserving state until replacement cache 60 is actually accessed. When a load instruction is decoded at decision block 502, a load operation is commenced at start load operation block 504. The first level tag arrays are then scanned as per block 505. More particularly, if the requested information is an instruction then linear instruction tag array 182 is scanned, whereas if the requested information is data then linear data tag array 310. The address of the requested information is compared with the first level tags which are scanned as per block 510. A test is then conducted at decision block 515 to determine if any of such tags match the address of the requested information. If there is a match between the address of the requested information and the scanned first level linear tags, then the requested information is retrieved from the appropriate first level store array (instruction store array 180 or data store array 315) and transmitted to microprocessor core 15.

However, if there is no such match, then the appropriate physical tag array is scanned as per block 525. More particularly, if the requested information is an instruction then physical instruction tag array 390 is scanned, whereas if the requested information is data then physical data tag array 392 is scanned. A test is then conducted at decision block 530 to determine if the address of the requested information matches any of the physical tags which are scanned. If such an address match is found, then an aliasing condition exists. When such an aliasing condition is found, the subject linear tag stored in the linear tag array is overwritten with the corresponding new linear tag of the request that matched the physical tag in the physical tag array as per block 535. The requested information is then transmitted to microprocessor core 15 as per block 540. It is noted that during the above described operations from block 500 to block 530 inclusive, replacement cache 60 is not being clocked and thus power is conserved.

However, returning to decision block 530, if it is determined that there is no match between the address of the requested information and the scanned physical tags, then a first level cache miss has occurred. In the event of such a first level cache miss, clocking of unified replacement cache 60 commences as per block 545 and power starts to be drawn in replacement cache 60 as accessing of cache 60 begins. More particularly, replacement tag array 70 is scanned in block 550. A test is conducted at decision block 555 to determine if the address of the requested information in the read operation matches any of the scanned replacement tags. If such a match is found, then a replacement cache hit has occurred. In the event of such a replacement cache hit, replacement cache 60 transmits the entry in replacement store array 65 which contains the requested information to first level cache 30 as per block 560. The transmitted entry is stored in first level cache 30 at a location determined by the particular set associative addressing scheme selected for such cache as per block 565. The requested information is then transmitted from first level cache 30 to microprocessor core 15 as per block 570. At block 575, first level cache 30 kicks out a discard entry as per the particular replacement algorithm used by cache 30. The discard entry is stored in replacement cache 60 at a location determined by the particular set associative addressing scheme selected for such cache as per block 580.

However, if no replacement tag match is found at decision block 555, then external main memory 50 is accessed to obtain the requested information for the subject read operation as per blocks 585 and 590. In this case the requested information, which is stored in main memory and which is sought in the subject read operation, is designated as main memory information. The entry in main memory 50 which contains the requested information is retrieved from main memory 50 at block 590 and is transmitted to first level cache 30 at block 595. This entry is then stored in first level cache 30 as per block 600. The requested main memory information in this entry is transmitted from first level cache 30 to microprocessor core 15 at block 605. Process flow then continues to block 575 at which the first level cache kicks out a discard entry and then to block 580 at which the discard entry from first level cache 30 is stored in replacement cache 60. Flow then continues back to the start load or other operation at block 500.

It is noted that as an alternative to the process flow depicted in FIG. 3A with respect to the aforementioned power conservation feature, replacement cache 60 can be returned to the idle state immediately after access to cache 60 is complete. In other words, clocking of replacement cache 60 can cease after the replacement cache access is complete without waiting until process flow returns to cache idle block 500.

Figure 3B:
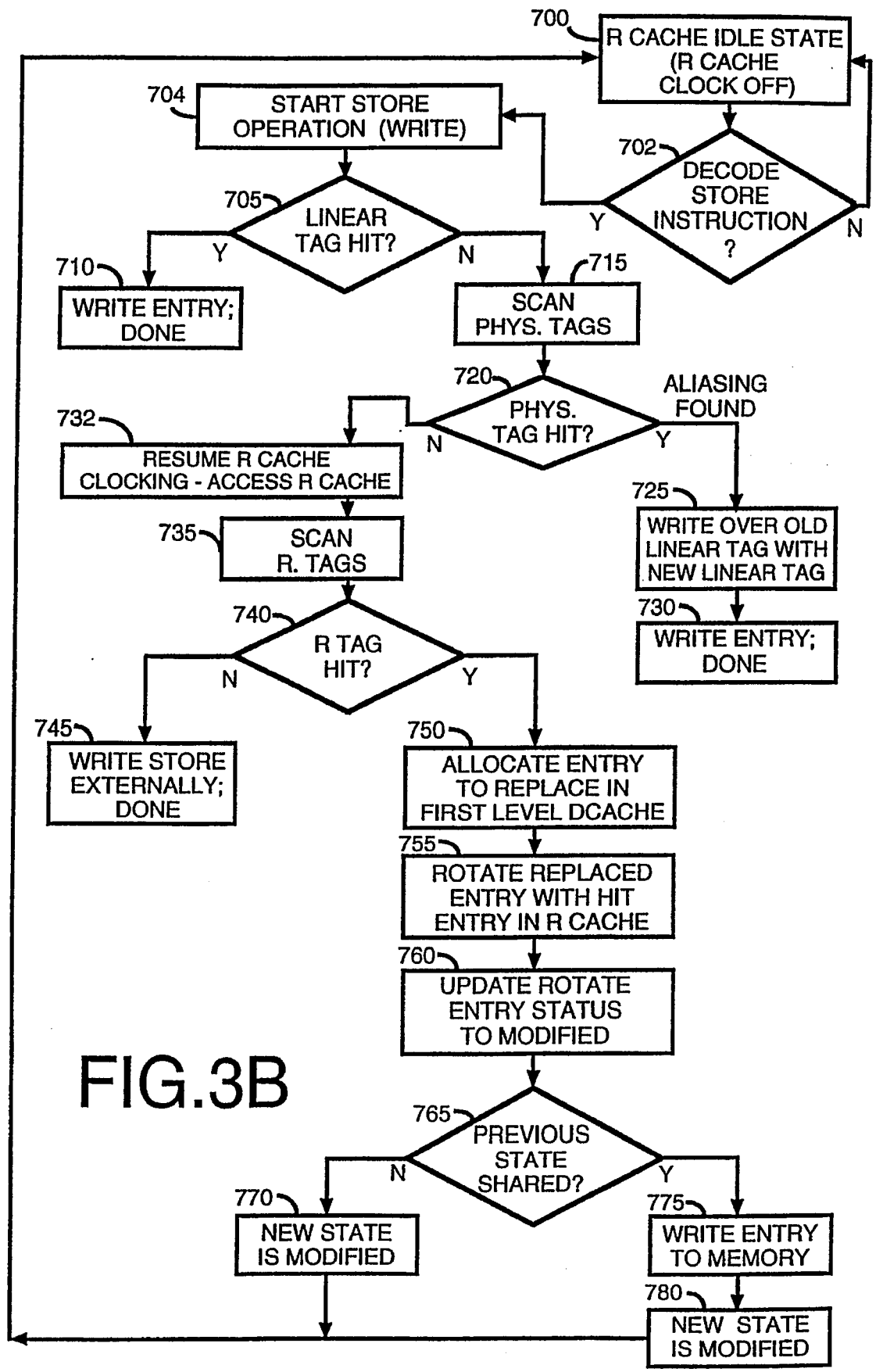
FIG. 3B is a flowchart showing the operation of the replacement cache architecture during a memory write operation.

A flowchart showing the operation of the replacement cache architecture during a memory write or store operation is depicted in FIG. 3B. Prior to actually commencing a store operation, replacement cache 60 is placed in an idle state wherein replacement cache 60 is not clocked as per block 700. Power is conserved when replacement cache 60 is not clocked. Replacement cache 60 stays in this idle, power conserving state until replacement cache 60 is actually accessed in the course of the write operation. When a store instruction is decoded at decision block 702, a store operation is commenced at start store operation block 704.

A test is then conducted at decision block 705 to determine if a linear tag hit has occurred. In other words, a test is performed to determine if the target address associated with the pending write operation matches any of the linear data tags in first level linear data tag array 310. If a match is found, then the data for the subject write operation is written at block 710 to the entry in first level data store array 312 containing the data associated with the write address.

However, if no such tag match is found, then the physical tags in physical data tag array 392 are scanned as per block 715. A test is conducted at decision block 720 to determine if a physical tag hit has occurred. More particularly, a check is made to determine if the target address of the pending write operation matches any of the tags of physical data tag array 392. If such a match is found then an aliasing condition exists. In the case of aliasing, multiple linear addresses are associated with the same physical address. In this event, the old linear tag is overwritten with the new linear tag at block 725. The data associated with the pending write operation is then written to the entry in first level data store array 312 which corresponds to the target address of the write operation as per block 730.

However, if there is no physical tag hit at decision block 720, then clocking of replacement cache 60 is resumed at block 732 and the replacement cache tags in replacement tag array 70 are scanned at block 735. A test is then conducted at decision block 740 to determine if a replacement tag hit has occurred. In other words, a comparison is performed to see if the target address of the pending write operation matches any tag in replacement tag array 70. If there is no such tag match, then a replacement cache miss has occurred and the pending write operation is carried out upon external memory 50 as per block 745. However, if there is a replacement tag match which signifies that a replacement tag hit has occurred, then the pending write operation is carried out on the replacement cache. To accomplish this, an entry to be replaced in the first level cache 30 is first allocated as per block 750. A rotation is then performed at block 755 whereby the replaced entry from first level cache 30 is rotated or switched with the hit entry in replacement cache 60. In other words, the entry for which the hit occurred in replacement cache 60 is transferred to first level data store array 312 and the entry which was allocated for replacement in data store array 312 is transferred to, and stored in, replacement store array 65. The status of the entry thus written in replacement cache 60 is then updated to modified as per block 760.

A test is conducted at decision block 765 to determine if the previous state was shared. If the previous state was not shared, then the new state is modified as per block 770. However, if the previous state was shared, then the entry is written to main memory 50 as per block 775. The new state is then regarded as exclusive as per block 780.

The terms Modified, Exclusive, Shared and Invalid as used herein conform to the well-known MESI protocol wherein modified, exclusive, shared and invalid (valid) bits are used to provide status information with respect to particular cache blocks or entries.

III. Detailed First Level and Replacement Cache Operation

Returning to FIG. 2, first level data store array 312 is coupled to load/store functional unit 134 of microprocessor core 15 and to IAD bus 102. Physical tag circuit 162 includes both physical instruction tag array 390 and physical data tag array 392. Physical tag circuit 162 interacts with both first level instruction cache store array 180 and first level data cache store array 312 via IAD bus 102. In this particular embodiment, instruction store array 180 and data store array 312 are both linearly addressable caches. Instruction store array 180 and data store array 312 are physically separate. However, both of these cache arrays are organized using the same architecture, i.e., both caches include a store array along with a corresponding tag array.

Microprocessor 10 also includes memory management unit (MMU) 164 and bus interface unit 45 (BIU). Memory management unit 164 is coupled to IAD bus 102 and physical tag circuit 162. Bus interface unit 45 is coupled to physical tag circuit 162 and IAD bus 102 as well as an external microprocessor bus such as the 486 XL bus.

Microprocessor 10 executes computer programs which include sequences of instructions. Computer programs are typically stored on a hard disk, floppy disk or other non-volatile storage media which are located in the computer system. When the program is run, the program is loaded from the storage media into a main memory 50 which is accessed by microprocessor 10 via bus interface unit 45. Once the instructions of the program and associated data are in main memory 50, individual instructions are prepared for execution and ultimately executed by microprocessor 10.

After being stored in main memory 50, the instructions are passed via bus interface unit 45 to first level instruction store array 180, where the instructions are temporarily held. Instruction decoder 108 receives the instructions from instruction cache 104. Instruction decoder 108 examines the instructions and determines the appropriate action to take. For example, decoder 108 may determine whether a particular instruction is a PUSH, POP, LOAD, AND, OR, EX OR, ADD, SUB, NOP, JUMP, JUMP on condition (BRANCH) or other instruction. Depending on which particular type of instruction that decoder 108 determines is present, the instruction is dispatched to the appropriate functional unit of microprocessor core 15 for that type.

Figure 4:
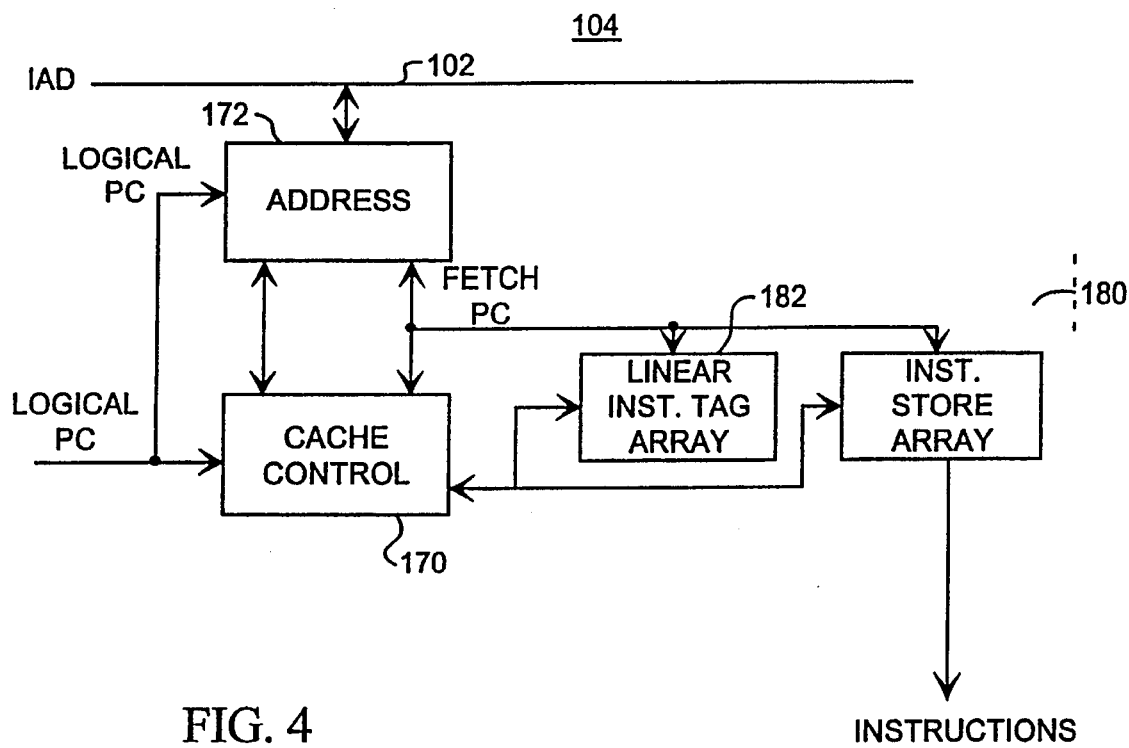
FIG. 4 is a block diagram of the first level linearly addressed instruction cache employed by the present invention.

Referring to FIG. 4, instruction cache 104 is shown in more detail. Instruction cache 104 is a linearly addressed, 16 Kbyte 4-way set associative cache. Each set includes 256 entries; each entry includes a sixteen byte instruction block and a linear address tag. Instruction cache 104 includes cache controller 170, address circuit 172, linear instruction tag array 182 and instruction store array 180. Cache controller 170 provides control signals to orchestrate the various operations of instruction cache 104. Address circuit 172 generates a linear fetch program counter (FETCH PC) based upon a logical target program counter (LOGICAL PC) which is received from microprocessor core 15. Address circuit 172 also provides address generation and X86 protection checking associated with pre-fetching instructions from external memory. Based upon the current FETCH PC value, the instruction corresponding to the main memory address associated with that value is successively fetched from main memory 50 as microprocessor core 15 progresses through the instructions of a program in memory in the course of executing that program. In other words, instructions are prefetched from main memory and stored in instruction store array 180 prior to actually being called into microprocessor core 15 by the advancement of the FETCH PC. Address circuit 172 functions as a translation circuit for translating between logical addresses and linear addresses. Instruction cache 104 stores instructions received via IAD bus 102. When microprocessor 10 accesses main memory 50 as in the case of a cache miss in first level cache 30 and replacement cache 60, the accessed entry from main memory is stored in first level cache 30 for later use by microprocessor core 15 should that be necessary. The FETCH PC value is incremented and continues to progress forward as successive instructions are retrieved from main memory and stored in first level cache 30.

Instruction cache 104 is organized into two main arrays, namely instruction cache store array 180 and linear tag array 182. Instruction cache store array 180 stores 16 byte lines or entries. Linear tag array 182 stores the linear address tags corresponding to the instructions. Each of these arrays is addressed by the linear FETCH PC address which is provided by address circuit 172.

Figure 5:
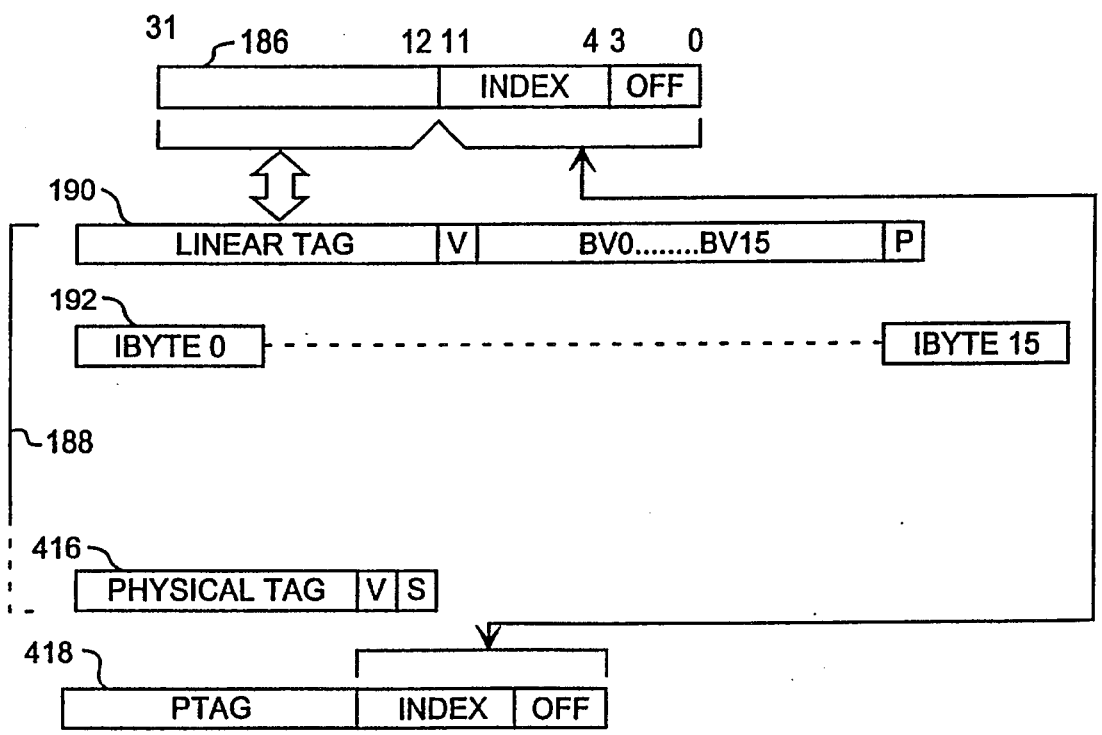
FIG. 5 is a representation of an entry of the FIG. 4 instruction cache along with the corresponding linear and physical addresses.

Referring to FIG. 5, the upper order bits of the linear FETCH PC address 186 are compared to the tags stored within linear tag array 182; these bits are stored as a linear tag when an entry is stored in instruction store array 180. The middle order bits of the FETCH PC address 186 provide a cache index which is used to address a block within the array and retrieve an entry from the block of the array. The lowest order bits provide an offset in the retrieved entry from BYTE0 of the instruction block which is stored in instruction store array 180; thus accessing the actual byte addressed by the FETCH PC address.

Instruction cache entry 188 of cache 104 includes linear address tag entry 190 and instruction entry 192. Instruction entry 192 includes a sixteen byte (IBYTE0–IBYTE 15) block of instructions. Linear address tag entry 190 includes a linear tag value (LTAG), linear tag valid bit (TV), sixteen byte valid bits (BV0–BV15) and valid physical translation bit (P). The linear tag value, which corresponds to the upper 20 bits of the linear FETCH PC address, indicates the linear block frame address of a block that is stored in the corresponding store array entry. The linear tag valid value indicates whether or not the linear tag value is valid. Each byte valid bit indicates whether the corresponding byte of the sixteen byte instruction entry is valid. The valid physical translation bit indicates whether or not an entry provides a successful physical tag hit.

Figure 6:
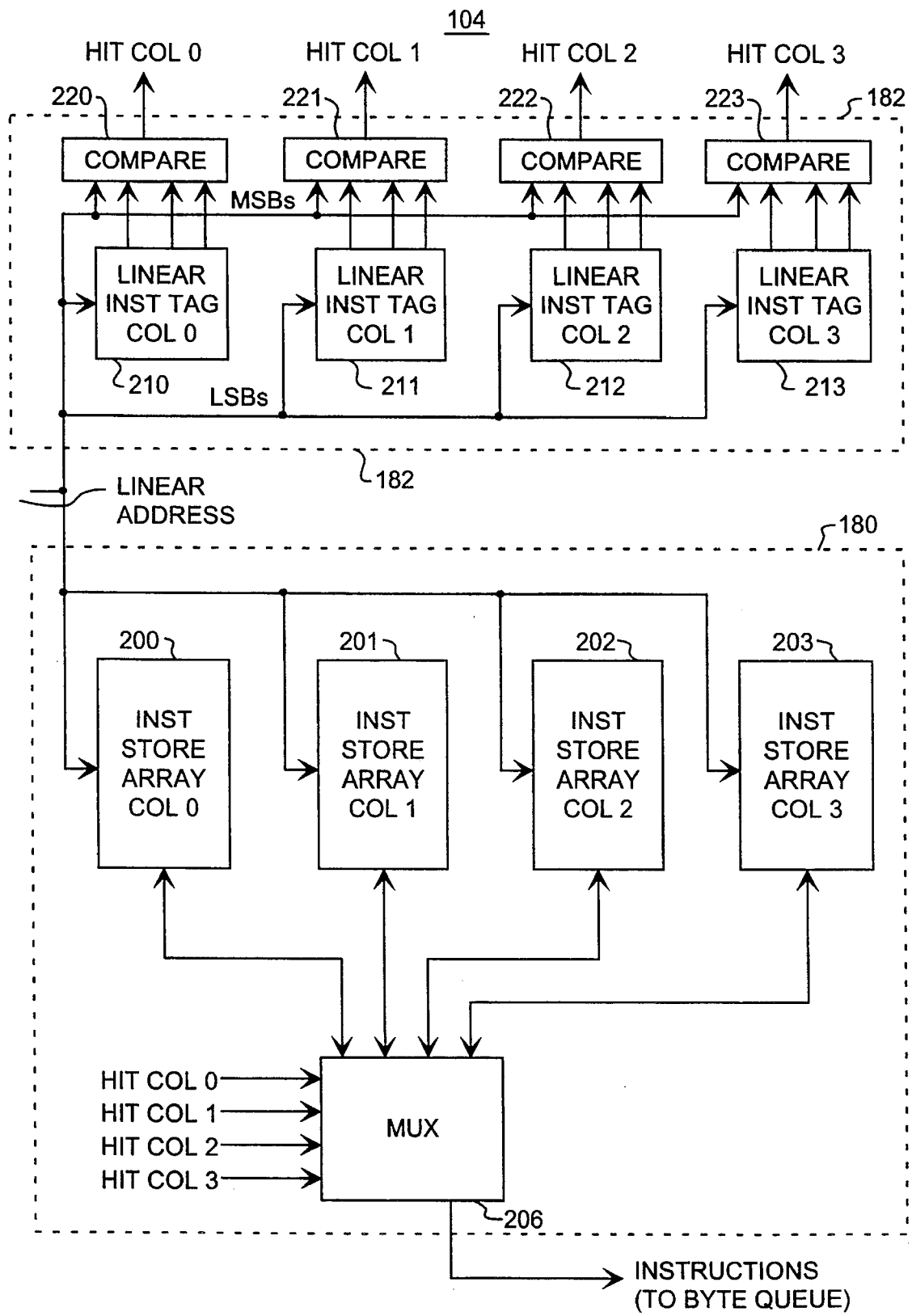
FIG. 6 is a block diagram of a linear tag array and a store array of the FIG. 4 instruction cache.

Referring to FIG. 6, linear instruction tag array 182 and instruction store array 180 of linearly addressable instruction cache 104 are shown in more detail. It should be recalled that instruction cache 104 is part of the split instruction-data first level cache 30. Instruction cache 104 is arranged in four 4-Kbyte columns, column 0, column 1, column 2 and column 3, corresponding to the four sets of instruction cache 104. Instruction store array 180 includes four separate store arrays, column 0 store array 200, column 1 store array 201, column 2 store array 202 and column 3 store array 203 as well as multiplexer (MUX) circuit 206. Multiplexer 206 receives column hit indication control signals from linear tag array 182 which indicate whether there was a match to a linear tag value stored in the linear tag array and provides the instruction which is stored in one of the columns of the store arrays as output.

Address tag array 182 includes linear tag arrays 210–213 corresponding to columns 0–3. Linear tag arrays 210–213 are organized with the same set and block configuration as store arrays 200–203. Linear tag arrays 210–213 each include a plurality of linear tag entries corresponding to the entries of respective store arrays 200–203. Each linear tag array is coupled with a respective compare circuit 220–223 which provides a respective column hit indication signal (COL HIT0–COL HIT3). Accordingly, each column of instruction cache 104 includes a store array, a linear tag array and a compare circuit. Store arrays 200–203, address tag arrays 210–211, and compare circuits 220 –223 all receive the linear address FETCH PC from address circuit 172.

Figure 7:
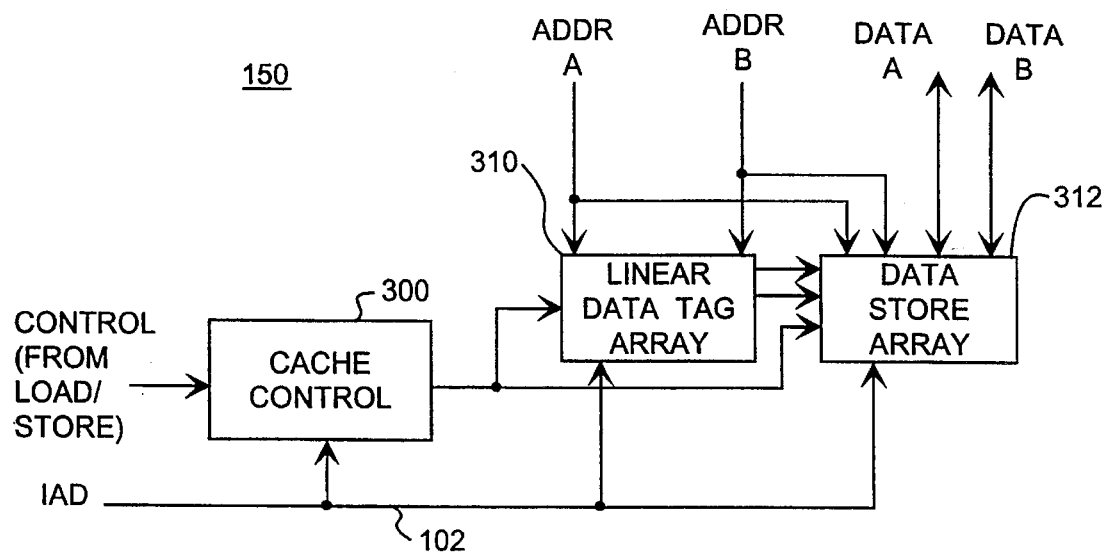
FIG. 7 is a block diagram of a linearly addressed data cache employed by the present invention.

Referring to FIG. 7, a description of data cache 150 with reference to the present invention is presented. Data cache 150 is a linearly addressed, 8 Kbyte 4-way set associative cache. Each set of data cache 150 includes 128 entries; each entry includes a sixteen byte block of information. (It is noted that if a 16 Kbyte 4-way set associative cache were employed as data cache 150, then each set of data cache 150 would includes 256 entries.) Data cache 150 includes data cache controller 300, data store array 312 and a linear data tag array 310. Data cache controller 300 provides control signals to orchestrate the various operations of data cache 150. Data cache controller 300 receives control signals (CONTROL) from load store section 134 as well as from IAD bus 102; data cache controller 300 provides control signals to cache array 304. Data store array 312 stores data in blocks and provides the blocks of data when a particular block is addressed. Data store array 312 is also coupled with IAD bus 102; in addition to the control signals from cache controller 300, data store array 312 receives address signals and data signals from load store section 134.

Data cache 150 is organized into two arrays, data store array 312 and linear data tag circuit 310. Data cache array 312 receives and provides two data signals (DATA A, DATA B) to load/store functional unit 134. Linear data tag array 310 is addressed by two linear addresses (ADDR A, ADDR B) which are provided by load/store functional unit 134; the two linear addresses are also provided to data store array 312. Accordingly, data cache 150 is a dual ported memory array, both ports being coupled with load/store functional unit 134 to allow two data values to be written or read simultaneously. Data store array 312 also receives control signals from linear tag array 310.

Figure 8:
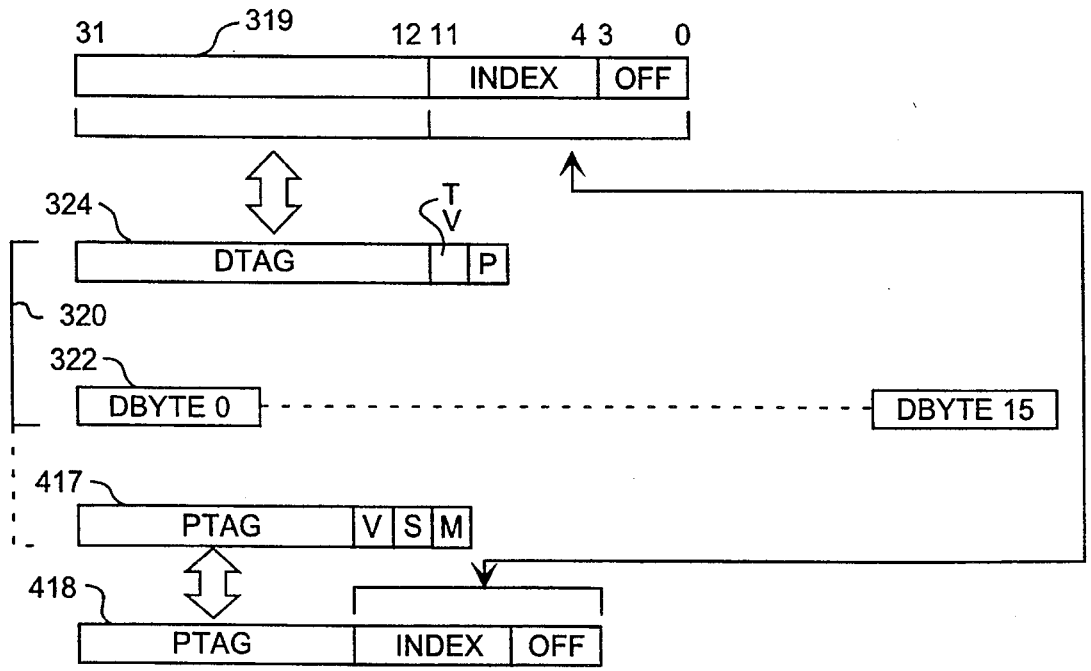
FIG. 8 is a representation of an entry of the data cache of FIG. 7 along with the corresponding linear and physical addresses.

Referring to FIG. 8, the middle order bits of each linear address 319 provide a cache block index (INDEX) which is used to address a block within each column of the linear tag arrays and retrieve an entry from each store array. The upper order bits of each linear address are compared to the linear data tags of each column of linear tag array 310, and thus select one of the columns which are accessed by the cache block index. The lowest order bits of each linear address provide an offset (OFF) into the retrieved entry to access the actual byte addressed by the linear address.

Data cache entry 320 of data cache 150 includes linear address tag entry 324 and data entry 322. Data entry 322 includes a sixteen byte (DBYTE0–DBYTE 15) block of data. Data linear address tag entry 324 includes a data linear tag value (DTAG), linear tag valid bit (TV), a data valid bit (DV), and valid physical translation bit (P). The data linear tag value, which corresponds to the upper 21 bits of the linear address, indicates the linear block frame address of a block which is stored in the corresponding store array entry. The linear tag valid bit indicates whether or not the linear tag is valid. The data valid bit indicates whether or not a corresponding entry in store array is valid. The valid physical translation bit indicates whether or not an entry provides a successful physical tag hit.

Figure 9:
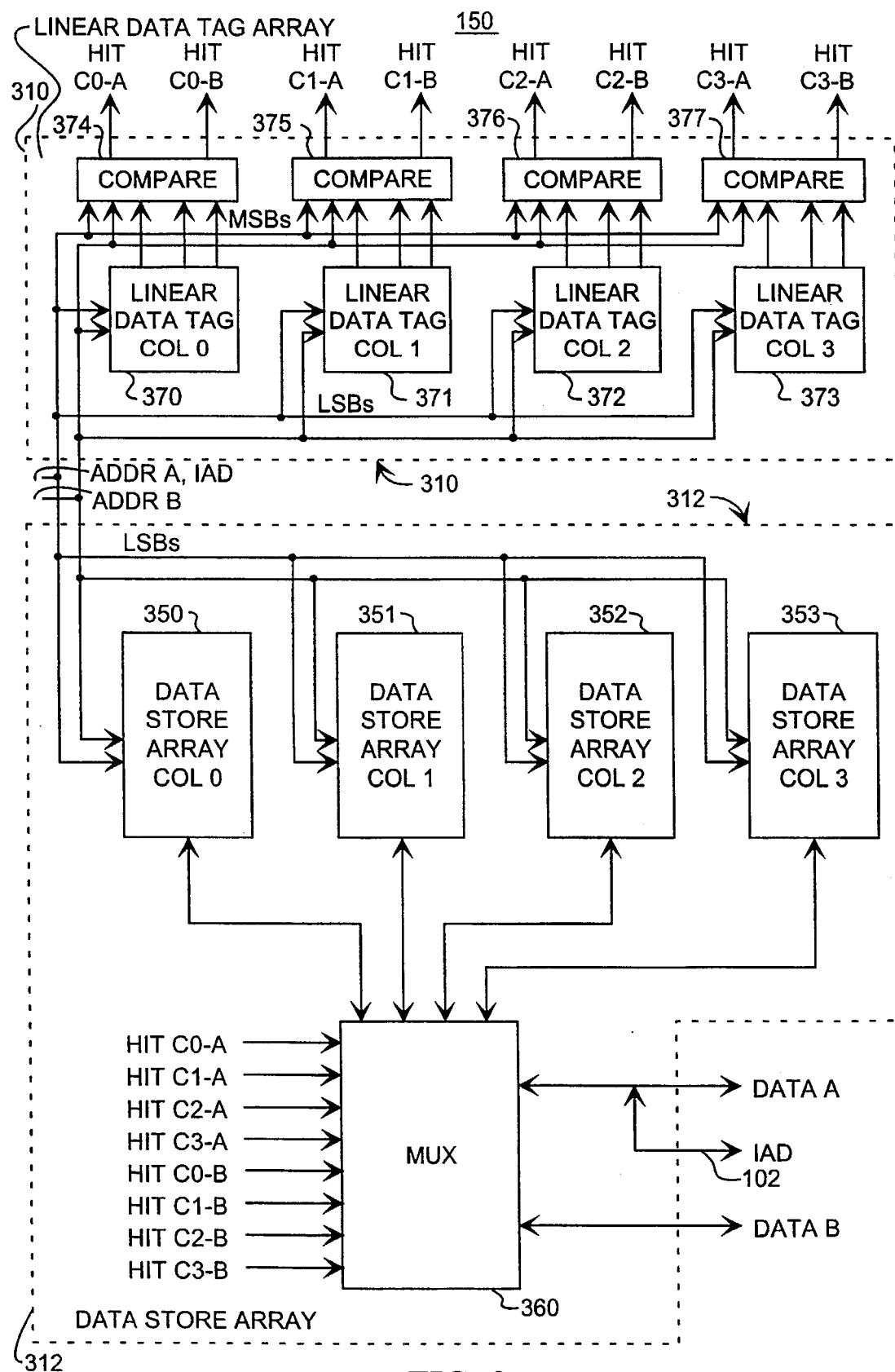
FIG. 9 is a block diagram of a linear tag array and a data store array of the FIG. 7 data cache.

Referring to FIG. 9, linear data tag array 310 and data store array 312 of linearly addressable data cache 150 are shown. Data cache 150 is arranged in four 2-Kbyte columns, namely, column 0, column 1, column 2, and column 3. The arrangement of linear data tag array 310 and data store array 312 is similar to that of linear instruction tag array 182 and instruction store array 180. However, linear data tag array 310 simultaneously receives two linear addresses (ADDR A, ADDR B) and data store array 312 simultaneously receives and provides two data signals (DATA A, DATA B), i.e., data cache 150 functions as a dual ported data cache.

Data store array 312 includes four separate data store arrays, column 0 store array 350, column 1 store array 351, column 2 store array 352, and column 3 store array 353 as well as multiplexer (MUX) circuit 360. Multiplexer 360 receives control signals from linear data tag array 310 which indicate whether there is a match to a linear tag value stored in a respective linear tag array. Multiplexer 360 receives and provides the data to store arrays 350–353; multiplexer 360 also receives and provides the data to IAD bus 102 as well as load/store functional unit 134.

Linear tag array circuit 310 includes linear tag arrays 370–373 corresponding to columns 0–3. Each linear tag array is coupled with a corresponding compare circuit 374–377. Accordingly, each column of data cache 150 includes a store array, a linear tag array and a compare circuit. Store arrays 350–353, address tag arrays 370–373, and compare circuits 374–377 all receive the linear addresses, ADDR A, ADDR B from load/store functional unit 134.

Figure 10:
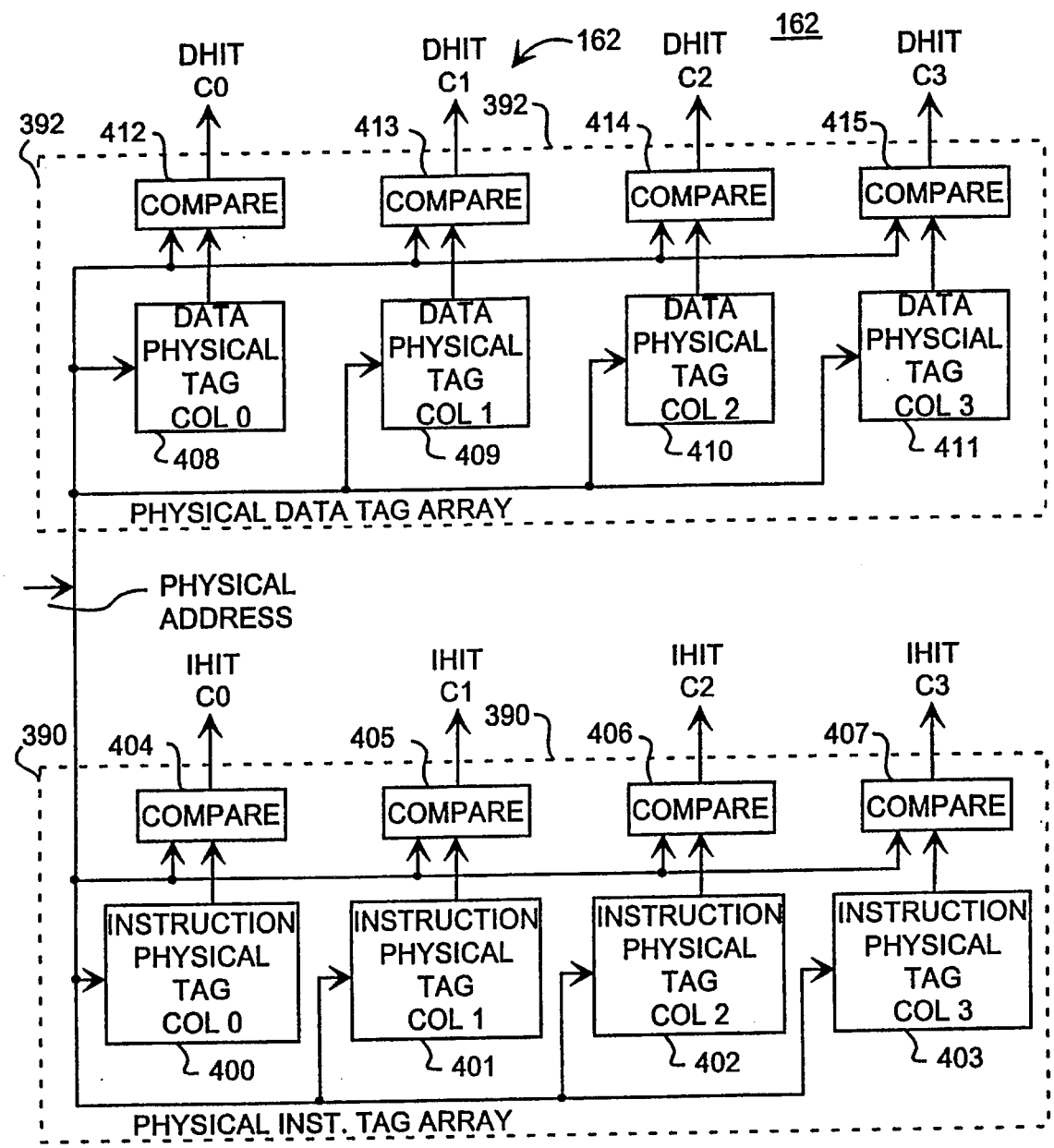
FIG. 10 is a block diagram of a physical tag circuit employed by the present invention.

Referring to FIG. 10, physical tag circuit 162 includes instruction physical tag array portion 390 and data physical tag array portion 392. Instruction physical tag array portion 390 includes a plurality of instruction physical tag arrays 400, 401, 402, 403 and a plurality of instruction compare circuits 404, 405, 406, 407. Data physical tag array portion includes a plurality of data physical tag arrays 408, 409, 410, 411 and a plurality of corresponding data compare circuits 412, 413, 414, 415. Instruction physical tag arrays 400–403 correspond to column 0–3 of instruction cache 104. Data physical tag arrays 408–411 correspond to columns 0–3 of data cache 150.

Instruction physical tag arrays 400–403 receive the least significant bits of the physical address that is provided by bus interface unit 45 and provide a respective physical tag to compare circuits 404–407, which also receive the most significant bits of the same physical address. Compare circuits 404–407 provide respective instruction column hit indication signals (IHIT C0–IHIT C3) to instruction store array 180. These instruction column hit indication signals are provided to the HIT COL inputs of multiplexer 206 (see FIG. 6) to control which column store array provides an output instruction.

Data physical tag arrays 408–411 receive the least significant bits of the physical address that is provided by bus interface unit 45 and provide a respective data physical tag to compare circuits 412–415, which also receive the most significant bits of the same physical address. Compare circuits 412–415 provide respective data column hit indication signals (DHIT CO–DHIT C3) to data store array 312. These data column hit indication signals are provided to the HIT COL A inputs of multiplexer 360 (see FIG. 9) to control which column store array provides an output instruction.

By providing physical tag arrays which are accessed separately from the store arrays, cache 150 is more efficient as it is not necessary to access store arrays 350–353, and thus to provide the power required to access these arrays, to access the physical tags during bus watching operations. Moreover, further efficiencies are achieved since the linear to physical address translation path is not part of this speed path. This is so because only linear tags are accessed directly from the microprocessor core.

Referring to FIGS. 5, 8, 10 and 12, physical tag arrays 400–403, 408–411 are organized with the same set and block relationship as their corresponding linear tag arrays. In other words, instruction physical tag arrays 400, 401, 402, 403 each include a plurality of instruction physical tag entries corresponding to the entries of instruction linear tag arrays 210, 211, 212, 213 of instruction cache 104 and data physical tag arrays 408, 409, 410, 411 include a plurality of data physical tag entries corresponding to the entries of linear data tag arrays 370, 371, 372, 373 of data cache 150. Accordingly, each instruction physical tag entry 416 is conceptually included as part of instruction entry 188 and each data physical tag entry 417 is conceptually included as part of data entry 320.

Figure 12:
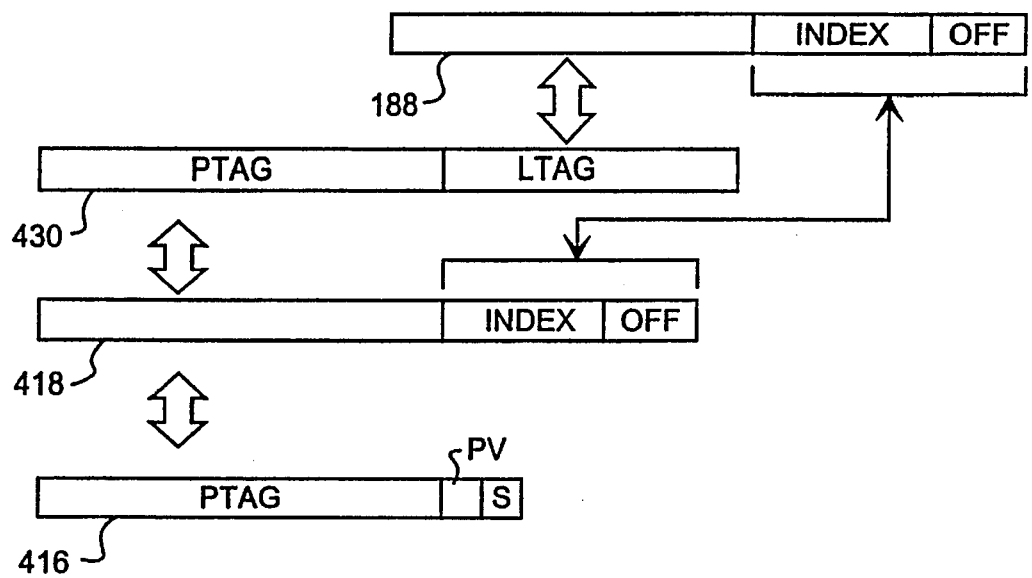
FIG. 12 is a block diagram of an entry of the physical tag circuit of FIG. 10 and an entry of the translation lookaside buffer of FIG. 11 along with the corresponding linear and physical addresses.

As seen in FIG. 12, each physical tag entry 416, 417 includes a physical tag value (PTAG), a physical tag valid bit (PV), and a shared bit (S). Additionally, each data physical tag entry 417 also includes a modified bit (M), a cache disable bit (CD) and a write through bit (WT). The physical tag value indicates the physical address after translation from the linear address of the physical address 418 which corresponds to the information which is stored in the corresponding entry of the corresponding store array. The physical tag valid bit indicates whether or not the corresponding entry of the corresponding store array contains valid information. The shared bit indicates whether another cache elsewhere in a computer system of which processor 100 is a part has the same data. The modified bit indicates whether the data stored in the store array has been modified (i.e., written to) and therefore is not consistent with the corresponding data stored externally of the cache. The cache disable bit indicates whether this particular entry is cache disabled, i.e., cannot be stored in its respective cache. The write through bit indicates that when the entry is written to the cache, it should also be written to the entry's corresponding external memory location.

Figure 11:
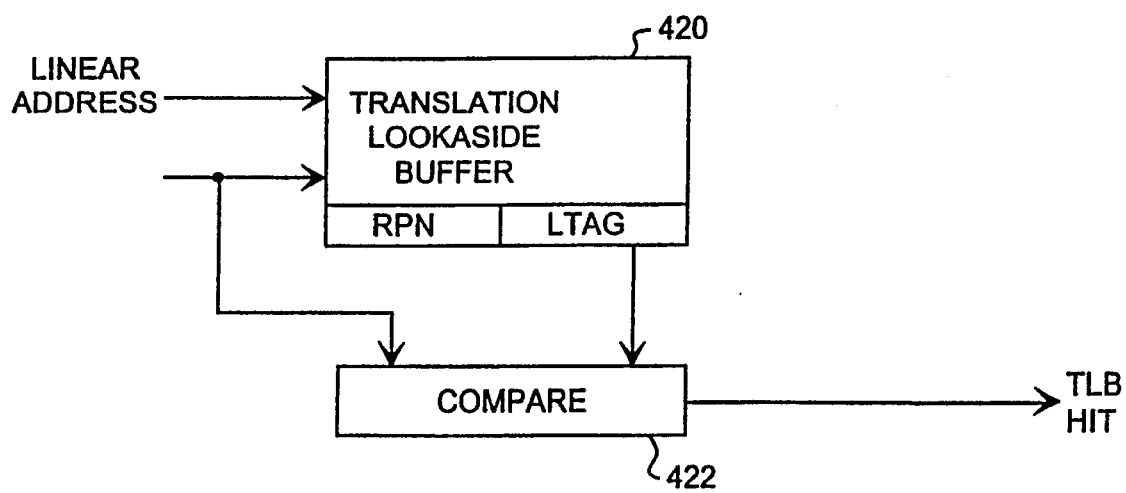
FIG. 11 is a block diagram of a translation lookaside buffer employed by the present invention.

Referring to FIG. 11, memory management unit 164 includes TLB array 420 as well as TLB compare circuit 422. TLB array 420 is organized as a 4 way set associative cache. Each set includes 32 entries to provide a total of 128 TLB entries. Memory management unit 164 functions as a translation circuit for translating between linear addresses and physical addresses.

Referring to FIG. 12, each TLB entry 430 of TLB 164 includes a linear tag (LTAG) value and a physical tag (PTAG) value. The linear tag value corresponds to the most significant bits of a linear address 320 and physical tag value corresponds to the most significant bits of a physical address 418 that corresponds to linear address 320. By concatenating the physical tag value with the lower order bits of the linear address 320 which corresponds to the linear tag entry, the physical address is advantageously obtained without using two levels of page tables.

Figure 13:
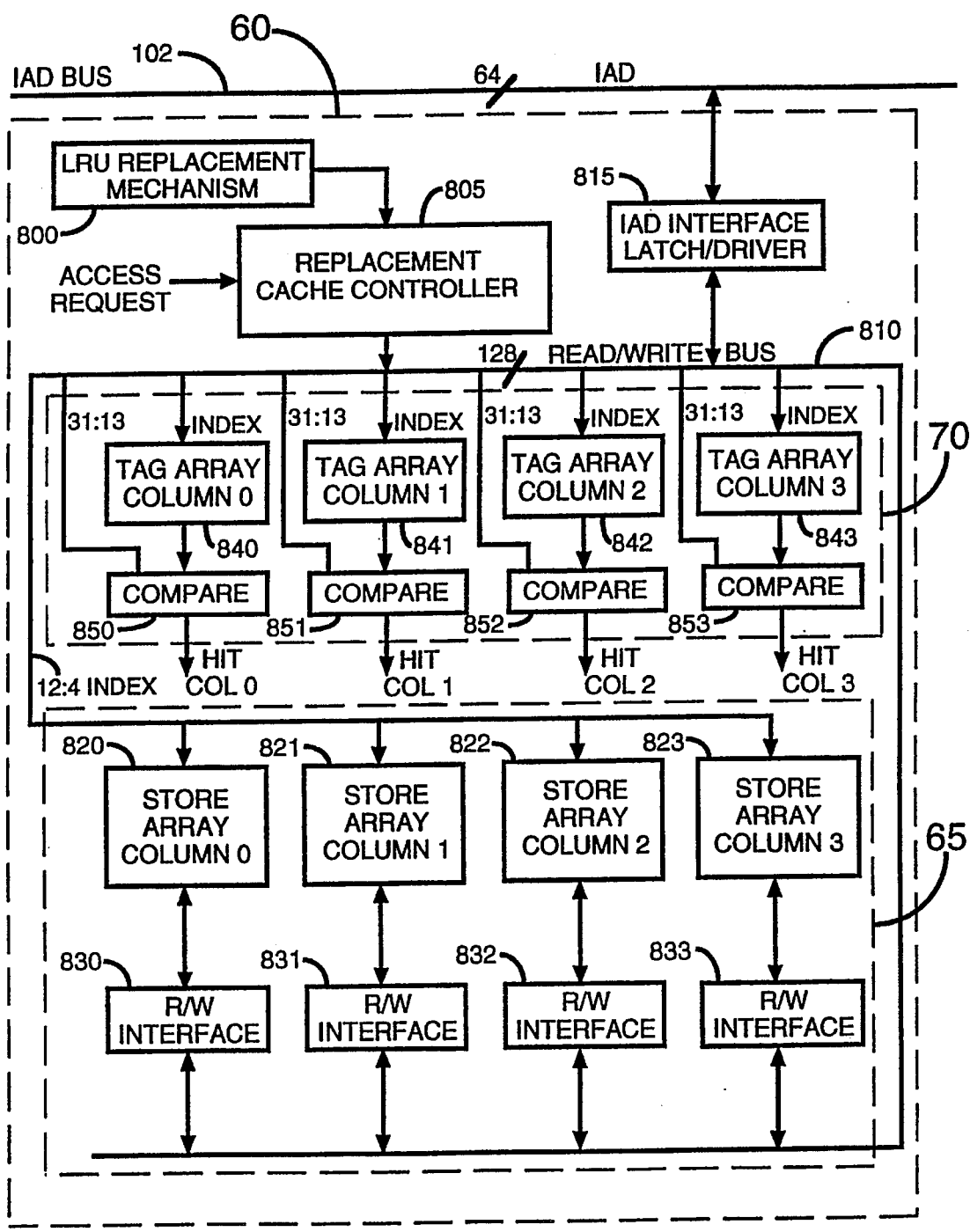
FIG. 13 is a block diagram of the replacement cache employed by the present invention.

FIG. 13 shows a detailed block diagram of replacement cache 60. Replacement cache 60 includes a replacement mechanism 800, for example an LRU replacement mechanism. Replacement mechanism 800 implements a particular replacement strategy for replacement cache 60. For example, the replacement mechanism selected for replacement cache may be an LRU, LFU or a random replacement algorithm. When a replacement cache entry is removed from the replacement cache by the replacement algorithm associated therewith, that entry is written back to main memory if that entry was modified. Otherwise the entry is discarded.

Replacement mechanism 800 is coupled to a replacement cache controller 805 which receives access requests at an input thereof. Cache controller 805 is coupled to a 128 bit read/write bus 810. Read/write bus 810 is sufficiently wide to accommodate a 16 byte cache block or entry. Read/write bus 810 is coupled via an IAD interface (latch/driver) 815 to internal address data (IAD) bus 102 as shown to enable address and data information to be written to and retrieved from replacement cache 60.

As seen in FIG. 13, replacement cache 60 includes store replacement array 65 and replacement tag array 70. Replacement cache 60 is a unified cache and thus store array 65 stores both instructions and data. Replacement cache 60 is arranged in four 8 Kbyte columns, namely column 0, column 1, column 2, and column 3 corresponding to the four sets of this four way set associative cache. Replacement store array 65 includes four separate store arrays, namely column 0 store array 820, column store array 821, column store array 822 and column store array 823. Each of store arrays 820, 821, 822 and 823 store 8 Kbytes in this particular 32 Kbyte replacement cache implementation. Each store array stores up to 512 entries, namely 512 16 byte entries or blocks in this case. Each of the store arrays stores a different one of the four sets of this four way set associative cache.

Replacement store array 65 further includes read/write (R/W) interfaces 830, 831, 832 and 833 respectively coupled to column 0 store array 820, column 1 store array 821, column 2 store array 822 and column 3store array 823 as shown. R/W interfaces 830–833 receive column hit information control signals from replacement tag array 70 which indicate whether there was a match to a tag stored in replacement tag array 70 and further provide the instruction or data which is stored in one of the columns of the store array as output. More specifically, the column hit information control signals HIT COL 0, HIT COL 1, HIT COL 2 and HIT COL 3 are provided to R/W interfaces 830, 831, 832 and 833, respectively (connection not shown). In one embodiment of the invention, R/W interfaces 830–833 are implemented as a multiplexer in a manner similar to that shown in FIG. 6. with respect to multiplexer 206.

Replacement tag array 70 includes four separate tag arrays, namely column 0 tag array 840, column 1 tag array 841, column 2 tag array 842 and column 3 tag array 843. Each tag array is capable of storing 512 16 byte tags, namely one tag per each entry of the store array for that column. The separate tag arrays 840–843 are all coupled to read/write bus 810 to receive the index portion (bits 12:4) of the blocks provided by R/W bus 810. The outputs of tag arrays 840–843 are coupled to respective comparators 850–853 as shown. Each comparator is provided with the tag value associated with the pending read or write operation. Comparators 850–853 perform compare operations which indicate when hits occur in arrays 840–843, respectively.

Figure 14A:
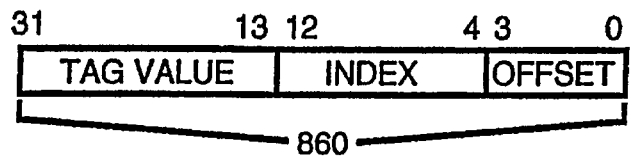
FIG. 14A is a physical address of an instruction or data employed by thee addressing scheme employed by the memory architecture of the present invention.

Referring now to FIG. 14A, the middle order bits (12:4) of physical address 860 provide a cache block index (INDEX) which is used to address a block within each column of replacement tag arrays 840–843 and retrieve an entry from each store array. The upper order bits (31:13), namely the TAG VALUE, of each physical address 860 are compared to the tags of each column of replacement tag array 810, and thus select one of the columns which is accessed by the cache block index (INDEX). The lowest order bits (3:0) provide an offset (OFFSET) into the retrieved entry to access the actual byte addressed by physical address 860.

Figure 14B:
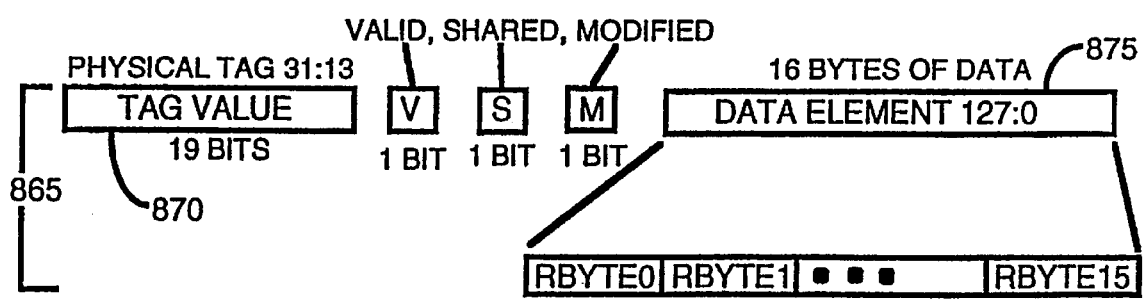
FIG. 14B is a representation of an entry or line employed by the memory architecture of the present invention.

FIG. 14B is a representation of the value stored in each replacement cache entry or block 865. Replacement cache entry 865 includes address tag entry 870 and data entry 875. Data entry 875 includes a sixteen byte (RBYTE0, RBYTE1, ... RBYTE15) block of data. The value stored in each block also includes a physical tag valid bit (V), a shared bit (S) and a modified bit (M).

By way of summary, the operation of the memory cache architecture is now discussed in the situation where a miss in the replacement cache occurs. For a replacement cache miss to occur, there must first be a miss in first level cache 30. In this example, it will be assumed that the pending operation is an instruction read. However, this discussion applies in general to a data reads and writes as well.

When an instruction read is pending, the first level instruction cache linear tags are first accessed. It is assumed that there is no match between the requested address and the tags stored in the first level linear tag array. In this event, the linear address is translated to a physical address by the translation lookaside buffer array 420. The resultant physical tag is then checked for aliasing. If a tag match is still not found, then a first level cache miss has occurred. In the event of a first level cache miss, the replacement cache physical tags are accessed and checked for a tag match. If no match is found, then a replacement cache miss has occurred.

when a replacement cache miss occurs, an external memory access to main memory 50 is conducted to obtain the addressed information. The entry in main memory 50 which contains the requested information is transmitted to first level cache 30 and is stored therein according the 4-way set associative addressing scheme of that cache. The particular entry to be replaced in first level cache 30 is then determined according to the replacement algorithm employed for cache 30. In this example, it is assumed that a random replacement algorithm is employed for first level cache 30. A random counter (not shown) picks from 0:3 and in this particular instance picks 2. Thus entry number 2 is expelled from first level cache 30 and is driven to replacement cache 60. Entry number 2 includes physical address information, a valid bit (V) and 16 bytes of store data. It is noted that if we were dealing with data, as opposed to the instruction of the present example, that entry number 2 would also include the state of the shared bits (S) and modified bits (M). In the case of instructions however, the shared bit (S) and the modified bit (M) are always set to exclusive since instructions are not modified.

The replacement cache then takes the physical address of the entry (discard entry) that was driven from the first level cache to the replacement cache and accesses its own 4-way set associative cache. In this particular example, it is assumed that the replacement cache is employing a random replacement algorithm to determine replacement and that the random number this time is 3. Thus, entry number 3 is copied to a temporary latch (not shown) prior to being discarded. The discard entry from first level cache 30 is then written into entry 3 of replacement cache 60 as per the set associativity scheme selected for replacement cache 60. In one embodiment of the invention, if the replacement cache replacement algorithm selects entry 3 of replacement cache 60 as the entry to be discarded, the discard entry from the first level cache is written into replacement cache 60 at the same place that entry 3 used to occupy in the replacement cache prior to being discarded.

The entry thus written into replacement cache 60 includes a physical tag, valid bit (V), shared bit (S), modified bit (M) and 16 bytes of data. The status of the entry from replacement cache 60 that was copied into the temporary latch is then inspected. If the status of the entry in the temporary latch is shared, exclusive or invalid it is discarded. If the status of the entry in the temporary latch is modified, then it is written back to main memory 50.

Further, by way of summary, the operation of the memory cache architecture is now discussed in the situation wherein a miss occurs in the first level cache and a hit occurs in the replacement cache. In this example, it is assumed that the pending operation is a data read (or load) operation. A data write operation is similar to the operation described. In this instance, first level cache 30 is accessed. The linear tags in the first level cache are checked and a miss is observed. The linear address associated with the read operation is then translated to the corresponding physical address via the translation lookaside buffer. Next, the physical instruction/ data tags are checked for an alias. A physical tag miss is then observed in the first level cache.

In the event of a first level cache miss, the replacement physical tags of the replacement cache are scanned for a match with the address information of the pending read operation. In this example it is assumed that there is a hit on column 1 of replacement cache 60, ie. a hit has occurred somewhere in set 1 which is stored in replacement cache 60. When the replacement cache hit occurs, hit information signifying that such a hit has occurred is communicated from replacement cache 60 to first level cache 30. The first level cache then allocates an entry for later storage of the replacement cache hit entry according to the 4-way set associative addressing scheme used for first level cache 30. A random replacement algorithm is used in this example to determine the particular entry of data store array 312 that will be discarded. For purposes of this example, it is assumed that an entry in set 0 will be discarded. An entry in set 0 of data store array 312 is then written into a holding register (not shown) as the discard entry. The discard entry includes the set 0 physical address, data, shared, modified and valid bits. The discard entry from first level cache 30 is transmitted to replacement cache 60 and the requested entry (replacement cache hit entry) from replacement cache 60 is transmitted to first level cache 30. Thus, a rotation occurs between replacement cache 60 and first level cache 30.

Replacement cache 60 writes the discard entry in the holding register into replacement store array 65 in the column that hit (column 1 in this example). This write into the replacement store array includes tag, data, shared and modified bits. First level cache 30 then takes the physical address of the entry rotated from replacement cache 60 to cache 30 and writes the physical tag of such rotated entry to the corresponding physical tag array 392 in set 0 thereof. The linear tag associated with such rotated entry is written to linear data tag array 310 in set 0 thereof. The shared and modified bits of the rotated entry from replacement cache 60 are written into the physical tag array 392, also in set 0 thereof. The valid information and actual data of the rotated entry from the replacement cache are stored in data store array 312 as per the set associative convention. Microprocessor 10 then continues execution.

In the preferred embodiment of the invention, the size of the replacement cache store array is approximately the same size as the sum of the sizes of the first level cache instruction store array and data store array or larger. For example, when a split instruction/data store array is employed as first level cache 30, a 32 Kbyte replacement cache store array produces acceptable results when first level instruction store array is 16 Kbytes and the first level data store array is 8 Kbytes. In those cases where such split instruction/data store arrays are used as first level cache 30, as opposed to a unified cache being used for cache 30, the size of the first level cache is considered to be the sum of the sizes of the first level instruction and data store arrays. While generally the size of the replacement cache is approximately the same size as the size of the first level cache or larger, performance improvements are also achieved when the size of the replacement cache is within the range of approximately ½ the size of the first level cache to approximately 8 times the size of the first level cache or larger. For example, in the case where the size of the first level cache is 16 Kbytes, the size of the replacement cache ranges from approximately 8 Kbytes to approximately 256 Kbytes or larger. A limiting factor on the upper end is the availability of space on the microprocessor die.

While a microprocessor apparatus and memory architecture therefor have been described above, it is clear that a method for operating such apparatus has also been disclosed. Briefly, the method involves a microprocessor including a microprocessor core and a first level cache coupled together and situated on a common semiconductor die. A main memory is situated external to the microprocessor and is coupled to the microprocessor. The method of accessing memory includes the steps of providing a replacement cache situated on the semiconductor die and coupled to the first level cache, the replacement cache being at least as large as approximately one half the size of the first level cache. The method also includes the step of discarding an entry from the first level cache when a cache miss occurs in the first level cache, the entry thus discarded being designated the discard entry. The method further includes the step of storing the discard entry in the replacement cache for later use by the microprocessor core. The method also includes a step wherein the replacement cache supplies a hit entry to the first level cache when a cache hit occurs in the replacement cache. The method still further includes the step of storing the hit entry in the first level cache for later use by the microprocessor core.

The foregoing has described a microprocessor with an advanced cache memory system. The cache memory system of the present invention provides increased cache performance while avoiding undue increases in the amount of chip area consumed by the cache. The cache memory system of the present invention also desirably reducing the number of accesses to external memory. Moreover, power is advantageously conserved by this advanced cache memory system.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A microprocessor comprising:

a semiconductor die;

a microprocessor core situated on said semiconductor die;

a first level set associative cache situated on said semiconductor die and coupled to said microprocessor core, said first level cache having a predetermined byte size, said first level cache storing a predetermined number of information entries;

a replacement cache situated on said semiconductor die and coupled to said first level cache, said replacement cache storing information entries which are discarded from said first level cache as a result of first level cache misses, said replacement cache being at least as large as approximately one half the size of said first level cache;

a clock controller supplying a clocking signal to the replacement cache when the replacement cache is accessed and terminating the clocking signal to the replacement cache when accessing of the replacement cache is finished so that power is conserved, a clocking signal being supplied to the microprocessor core and the first level set associative cache whether the clocking signal to the replacement cache is supplied or terminated.

2. The microprocessor of claim 1 further comprising a replacement cache hit detection circuit, coupled to said replacement cache, for detecting when a hit occurs in said replacement cache and for supplying a hit entry from said replacement cache to said first level cache when a hit occurs in said replacement cache.

3. The microprocessor of claim 1 further comprising memory accessing means for accessing an external memory to retrieve a desired information entry when both a first level cache miss and a replacement cache miss occur.

4. The microprocessor of claim 1 wherein said replacement cache comprises a set associative replacement cache.

5. The microprocessor of claim 1 wherein said replacement cache comprises a 4 way set associative replacement cache.

6. The microprocessor of claim 1 wherein said first level cache comprises a 4 way set associative cache.

7. A microprocessor according to claim 1 further comprising: a signal line coupled from the first level set associative cache to the clock controller for carrying a signal indicative of first level cache misses, the clock controller supplying the clocking signal for activating the replacement cache and terminating the clocking signal for deactivating the replacement cache based on the signal indicative of first level cache misses.

8. A microprocessor comprising:

a semiconductor die;

a microprocessor core situated on said semiconductor die;

a first level set associative cache situated on said semiconductor die and coupled to said microprocessor core, said first level cache having a predetermined byte size, said first level cache storing a predetermined number of information entries;

a first level cache hit detector, coupled to said first level cache, for detecting when a hit occurs in said first level cache and for discarding an entry from said first level cache as a discard information entry when a cache miss occurs in said first level cache;

a replacement cache situated on said semiconductor die and coupled to said first level cache, said replacement cache storing discard information entries which are discarded from said first level cache as a result of first level cache misses, said replacement cache being at least as large as approximately one half the size of said first level cache;

a replacement cache hit detector, coupled to said replacement cache, for detecting when a hit occurs in said replacement cache after a first level cache miss and for supplying a hit entry from said replacement cache to said first level cache when a hit occurs in said replacement cache; and a clock controller for providing a clocking signal to said replacement cache when said replacement cache is being accessed and for not providing said clocking signal to said replacement cache when said replacement cache is not being accessed, such that power is conserved, a clocking signal being supplied to the microprocessor core and the first level set associative cache whether the clocking signal to the replacement cache is provided or not provided.

9. The microprocessor of claim 8 further comprising a first level cache hit detection circuit, situated in said first level cache, for detecting when a hit occurs in said first level cache and for discarding an entry from said first level cache as a discard information entry when a cache miss occurs in said first level cache.

10. The microprocessor of claim 8 further comprising an external memory for providing instructions and data to said microprocessor.

11. The microprocessor of claim 10 further comprising memory accessing means for accessing said external memory when both a first level cache miss occurs and a replacement cache miss occurs to retrieve a desired information entry from said external memory and send said desired information entry to said first level cache for storage therein.

12. The microprocessor of claim 8 wherein said replacement cache comprises a set associative replacement cache.

13. The microprocessor of claim 8 wherein said replacement cache comprises a 4 way set associative replacement cache.

14. The microprocessor of claim 8 wherein said first level cache comprises a 4 way set associative cache.

15. The microprocessor of claim 8 wherein said first level cache includes a first level instruction cache and a first level data cache.

16. A microprocessor according to claim 8 further comprising: a signal line coupled from the first level set associative cache to the clock controller for carrying a signal indicative of first level cache misses, the clock controller supplying the clocking signal for activating the replacement cache and terminating the clocking signal for deactivating the replacement cache based on the signal indicative of first level cache misses.

17. In a microprocessor including a microprocessor core situated on a semiconductor die, a main memory being situated external to said microprocessor and coupled to said microprocessor, a method of accessing memory comprising:

storing information entries in a first level set associative cache which is coupled to the microprocessor core and which is situated on the semiconductor die;

discarding an entry from said first level cache when a cache miss occurs in said first level cache, the entry thus discarded being designated the discard entry;

storing said discard entry in a replacement cache for later use by said microprocessor core, said replacement cache being situated on the semiconductor die, said replacement cache being at least as large as approximately one half the size of said first level cache;

said replacement cache supplying a hit entry to said first level cache when a cache hit occurs in said replacement cache, storing said hit entry in said first level cache for later use by said microprocessor core;

clocking the replacement cache during time periods when the replacement cache is accessed;

ceasing to clock the replacement cache during time periods when the replacement cache is not accessed; and clocking the microprocessor core and file first level cache during time periods when the replacement cache is accessed and not accessed.

18. The method of claim 17 wherein said replacement cache is set associative.

19. The method of claim 17 wherein said first level cache is four-way set associative.

20. A method according to claim 17 further comprising the step of:

clocking the replacement cache in response to a cache miss in the first level cache.

21. The method of claim 17 wherein said replacement cache is four-way set associative.

* * * * *

UNITED STATES PATENT AND TRADEMARK OFFICE
CERTIFICATE OF CORRECTION

PATENT NO. : 5,623,627
DATED : April 22, 1997
INVENTOR(S) : Witt

It is certified that error appears in the above-indentified patent and that said Letters Patent is hereby corrected as shown below:

Col. 3, line 43,   Delete "thee" and insert --the--;

Col. 17, line 33,  Delete "when" and insert --When--;

Col. 22, line 25,  Delete "file".

Signed and Sealed this

Twenty-first Day of October 1997

Attest:

Attesting Officer

BRUCE LEHMAN

Commissioner of Patents and Trademarks